(12) United States Patent
Eckhardt et al.

(10) Patent No.: US 10,685,125 B2
(45) Date of Patent: *Jun. 16, 2020

(54) MULTIPLE SECURITY LEVEL MONITOR FOR MONITORING A PLURALITY OF MIL-STD-1553 BUSES WITH MULTIPLE INDEPENDENT LEVELS OF SECURITY

(71) Applicant: THE BOEING COMPANY, Chicago, IL (US)

(72) Inventors: Josh D. Eckhardt, St. Peters, MO (US); Thomas E. Donofrio, Naugatuck, CT (US); Khaled Serag, Huntsville, AL (US)

(73) Assignee: THE BOEING COMPANY, Chicago, IL (US)

( * ) Notice: Subject to any disclaimer, the term of this patent is extended or adjusted under 35 U.S.C. 154(b) by 207 days.

This patent is subject to a terminal disclaimer.

(21) Appl. No.: 15/492,426

(22) Filed: Apr. 20, 2017

(65) Prior Publication Data

US 2018/0307845 A1    Oct. 25, 2018

(51) Int. Cl.
*G06F 21/60* (2013.01)
*G06F 21/85* (2013.01)
(Continued)

(52) U.S. Cl.
CPC .......... *G06F 21/60* (2013.01); *G06F 9/45558* (2013.01); *G06F 13/24* (2013.01); *G06F 13/4022* (2013.01); *G06F 13/4027* (2013.01); *G06F 13/4282* (2013.01); *G06F 21/53* (2013.01); *G06F 21/85* (2013.01); *G06F 2009/45579* (2013.01);
(Continued)

(58) Field of Classification Search
CPC .......... G06F 21/60; G06F 21/85; G06F 21/53; G06F 9/45558; G06F 13/24; G06F 13/4282

See application file for complete search history.

(56) References Cited

U.S. PATENT DOCUMENTS 5,093,910 A    3/1992  Tulpule et al.
5,471,462 A    11/1995 Amador
(Continued)

FOREIGN PATENT DOCUMENTS

EP    2892199 A1    7/2015

OTHER PUBLICATIONS

Extended European Search Report, Application No. 18155459.3-1216, dated Mar. 26, 2018.

*Primary Examiner* — Harunur Rashid
(74) *Attorney, Agent, or Firm* — Moore IP Law

(57) ABSTRACT

Disclosed is a Multiple Security Level Monitor ("MSLM") for monitoring a plurality of MIL-STD-1553 data buses ("1553 buses") having at least one security level. The MSLM includes a system high processing device ("SHPD") and a plurality of bus data monitors ("BDMs"). Each BDM is in signal communication with the SHPD via a plurality of signal paths that are separate from the plurality of 1553 buses. The plurality of BDMs includes least two BDMs. The first and second BDMs are in signal communication with a first and second 1553 bus having a first security level and second security level, respectively, where the signal communication is only in a receive mode from the first and second 1553 buses to the two BDMs.

20 Claims, 7 Drawing Sheets

(51) Int. Cl.
  *G06F 21/53* (2013.01)
  *G06F 9/455* (2018.01)
  *G06F 13/24* (2006.01)
  *G06F 13/42* (2006.01)
  *G06F 13/40* (2006.01)

(52) U.S. Cl.
  CPC ........... *G06F 2009/45583* (2013.01); *G06F 2009/45587* (2013.01); *G06F 2009/45591* (2013.01); *G06F 2221/2113* (2013.01); *G06F 2221/2149* (2013.01)

(56) References Cited

U.S. PATENT DOCUMENTS

| | | |
|---|---|---|
| 5,479,610 A | 12/1995 | Roll-Mecak et al. |
| 6,212,224 B1 | 4/2001 | Cammarota et al. |
| 6,598,828 B2 | 4/2003 | Fiebick et al. |
| 6,633,832 B1 | 10/2003 | Browen |
| 8,185,944 B2 | 5/2012 | Schnackenberg et al. |
| 8,286,231 B2 | 10/2012 | Arnold |
| 8,379,270 B2 | 2/2013 | Tomomatsu |
| 8,739,270 B1 | 5/2014 | Arnold |
| 9,071,357 B1 | 6/2015 | Shi et al. |
| 10,127,127 B2 | 11/2018 | Dashtipour et al. |
| 2004/0078714 A1 | 4/2004 | Hentsch |
| 2005/0148327 A1 | 11/2005 | Perez et al. |
| 2006/0101184 A1 | 5/2006 | Hegarty |
| 2006/0112119 A1 | 5/2006 | Vian et al. |
| 2007/0110053 A1 | 5/2007 | Soni et al. |
| 2007/0160075 A1* | 7/2007 | Carpassi ........... H04L 12/40032 370/451 |
| 2007/0204337 A1* | 8/2007 | Schnackenberg ... H04L 63/0227 726/11 |
| 2007/0230542 A1 | 10/2007 | Okada et al. |
| 2007/0239923 A1 | 10/2007 | Weber |
| 2008/0059954 A1 | 3/2008 | Martin |
| 2009/0083734 A1* | 3/2009 | Hotra ........................ G06F 21/51 718/1 |
| 2009/0132748 A1 | 5/2009 | Sheffield |
| 2010/0192217 A1* | 7/2010 | Arnold .................. H04L 63/105 726/13 |
| 2011/0314231 A1 | 12/2011 | O'Connor |
| 2012/0095663 A1 | 4/2012 | Roy et al. |
| 2012/0226839 A1 | 9/2012 | Fuoco et al. |
| 2013/0212207 A1 | 8/2013 | Ong |
| 2014/0136589 A1 | 5/2014 | Wahler |
| 2014/0380433 A1 | 12/2014 | Yerger et al. |
| 2015/0020152 A1 | 1/2015 | Litichever et al. |
| 2015/0186234 A1* | 7/2015 | Hofman ................ G06F 11/221 714/43 |
| 2015/0270985 A1 | 9/2015 | Sheffield et al. |
| 2017/0104790 A1 | 4/2017 | Meyers et al. |
| 2018/0004948 A1 | 1/2018 | Martin et al. |
| 2018/0025557 A1 | 1/2018 | Steinert |
| 2018/0144139 A1 | 5/2018 | Cheng et al. |
| 2018/0285300 A1 | 10/2018 | Prentice |
| 2018/0285309 A1 | 10/2018 | Prentice |
| 2018/0295148 A1 | 10/2018 | Mayorgo |
| 2018/0307577 A1 | 10/2018 | Eckhardt et al. |
| 2018/0307645 A1 | 10/2018 | Eckhardt et al. |
| 2018/0307845 A1 | 10/2018 | Eckhardt et al. |
| 2018/0367553 A1 | 12/2018 | Hayden et al. |
| 2019/0052658 A1 | 2/2019 | Clarke et al. |
| 2019/0098028 A1 | 3/2019 | Ektare et al. |
| 2019/0205986 A1 | 7/2019 | Friedman |

* cited by examiner

| Rule Number 502 | 2ND SECTION 504 ||||||||| 3RD SECTION 506 || 4TH SECTION 508 |||
|---|---|---|---|---|---|---|---|---|---|---|---|---|---|
| | Command Word Type 518 | Threat Level (System) 520 | First Command 522 |||| Second Command 524 |||| Audit of 4TH Section Violations 548 | Audit Data Capture 550 | Threat/ Risk Rating 552 | Deep Inspection 554 ||
| | | | RT 526 | T/R 528 | SB 530 | WC 532 | RT 534 | T/R 536 | SB 538 | WC 540 | | | | Yes/ No 556 | Values 558 |
| 1 510 | | | | | | | | | | | | | | | |
| 2 512 | | | | | | | | | | | | | | | |
| 3 514 | | | | | | | | | | | | | | | |

FIG. 5

MULTIPLE SECURITY LEVEL MONITOR FOR MONITORING A PLURALITY OF MIL-STD-1553 BUSES WITH MULTIPLE INDEPENDENT LEVELS OF SECURITY

CROSS-REFERENCE TO RELATED APPLICATIONS

This application is related to U.S. Nonprovisional patent application Ser. No. 15/492,329, filed on Apr. 20, 2017, entitled "Bus Data Monitor," and U.S. Nonprovisional patent application Ser. No. 15/493,022, filed on Apr. 20, 2017, entitled "System and Method of Monitoring Data Traffic On a MIL-STD-1553 Data Bus," which applications are each incorporated in their entirety in this application by this reference.

BACKGROUND

1. Field

The present disclosure is related to the MIL-STD-1553 data bus, and in particular, monitoring the MIL-STD-1553 data bus.

2. Related Art

MIL-STD-1553 is a military standard published by the United States Department of Defense that defines the mechanical, electrical, and functional characteristics of a serial data bus. The MIL-STD-1553 data bus ("1553 bus") was originally designed as an avionic data bus for use with military avionics, but has also become commonly used in spacecraft on-board data handling ("OBDH") subsystems, both military and civil. The 1553 bus features multiple redundant balanced line physical layers, a network interface, time division multiplexing, half-duplex command/response protocol, and can handle up to 31 Remote Terminals ("RT" devices). The 1553 bus system consists of a Bus Controller ("BC") controlling multiple RTs that all connected together by a data bus providing a single data path between the BC and all the associated RTs. The 1553 bus also includes a bus monitor that cannot transmit messages over the 1553 bus and has the primary role of monitoring and recording the bus transactions without interfering with the operations of the BC or the RTs.

Unfortunately, the known bus monitors for the 1553 bus are passive data gathering devices that record high level metrics and do not have the ability to determine if the data transmitted by the 1553 bus has anomalous activity, malicious data, or otherwise corrupted data. As such, there is a need to address these issues on the 1553 data bus. Additionally, modern vehicles typically utilize multiple 1553 buses that need to be monitored with multiple bus monitors or a signal combined bus monitor that is capable of monitoring multiple 1553 buses. However, this leads to another problem with some military or sensitive government applications because generally military or other security conscious government agencies typically have classified equipment operating on a vehicle that may be classified as confidential, secret, or top secret. In these situations, any classified equipment is isolated by placing it on a single 1553 bus such that any equipment on the 1553 bus is defined at a one specific classification level, i.e., either confidential, secret, or top secret. The problem with this situation is that the vehicle will also have at least one unclassified 1553 bus that is connected to a number of unclassified device, module, component, or circuits that control and/or operate things as simple as controlling the lights, on-board system sensors, etc. Moreover, the vehicle may also include equipment that is characterized at different security levels (i.e., secret—top secret, confidential—secret, confidential—top secret, or confidential—secret—top secret), which will require different 1553 buses for each security level.

In these types of situations, a single combined bus monitor capable of monitoring at least two different 1553 buses having different security levels requires a high level of complexity to guarantee with a high degree of trust that only the appropriate data from each individual 1553 bus is allowed to pass based on the appropriate security level and that there is no accidental leakage of data from a higher security level 1553 bus to a lower security level 1553 bus, i.e., top secret data accidently being passed to the a secret, confidential, or unclassified 1553 bus. As such, there is a need for a system and method that addresses the above mentioned problems.

SUMMARY

A Multiple Security Level Monitor ("MSLM") for monitoring a plurality of MIL-STD-1553 data buses ("1553 buses") having at least one security level is disclosed. The MSLM includes a system high processing device ("SHPD") and a plurality of bus data monitors ("BDMs"). Each BDM of the plurality of BDMs is in signal communication with the SHPD via a plurality of signal paths that are separate from the plurality of 1553 buses. The plurality of BDMs have at least a first BDM and a second BDM. The first BDM is in signal communication with a first 1553 bus having a first security level, where the signal communication is only in a receive mode from the first 1553 bus to the first BDM. The second BDM is in signal communication with a second 1553 bus having a second security level, where the signal communication is only in a receive mode from the second 1553 bus to the second BDM. The SHPD has a third security level that is equal to or higher than the first security level and the second security level and the SHPD is configured to control the plurality of BDMs. The SHPD includes a network interface configured to communicate at the third security level with a back channel system ("BCS") that is separate from the MSLM and the BCS is in signal communication with the SHPD via a signal path that is separate from the plurality of 1553 buses.

Also disclosed is another MSLM for monitoring a plurality of 1553 buses having different security levels. The MSLM includes a first, second, and third stovepipe systems. The first stovepipe system includes a first processor, a first 1553 device interface, and a first virtual machine ("VM") partition. The second stovepipe system includes a second processor, a second 1553 device interface, and a second VM partition. The third stovepipe system includes a third processor, a network interface, and a third VM partition. The first 1553 device interface is in signal communication with a first 1553 bus and the signal communication is only in a receive mode from the first 1553 bus to the first stovepipe system; the first 1553 bus has a first security level, the second 1553 device interface is in signal communication with a second 1553 bus and the signal communication is only in a receive mode from the second 1553 bus to the second stovepipe system; and the third stovepipe system is configured to control the first stovepipe system and the second stovepipe system. The network interface is configured to communicate at a third security level with a BCS that is separate from the MSLM and the BCS is in signal communication with the third stovepipe system via a signal path that is separate from the plurality of 1553 buses. The MSLM also includes a hypervisor and a shared memory, where the hypervisor and shared memory are in signal communication with the first stovepipe system, second stovepipe system, and third stovepipe system.

In an example of operation, the MSLM performs a method that includes receiving a first bus data from the first 1553 bus in signal communication with the first BDM and receiving a second bus data from the second 1553 bus in signal communication with the second BDM. The method further includes monitoring the first bus data to determine if the first bus data violates a first rule set and monitoring the second bus data to determine if the second bus data violates a second rule set. Moreover, the method includes transmitting the first bus data to the SHPD if the first bus data violates the first rule set and transmitting the second bus data to the SHPD if the second bus data violates the second rule set. The method then includes analyzing either the first bus data or the second bus data with the SHPD and transmitting a SHPD output data to the BCS, based on the results of analyzing either the first bus data or the second bus data, where the SHPD output data has a third security level that is equal to or higher than the first security level and the second security level. The SHPD output data is transmitted to the BCS via the network interface that is separate from the first 1553 bus and second 1553 bus.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

FIG. 5 is a table of an example of an implementation of monitor rules for the monitoring section, shown in FIGS. 2 through 4, in accordance with the present disclosure.

DETAILED DESCRIPTION

Figure 1:
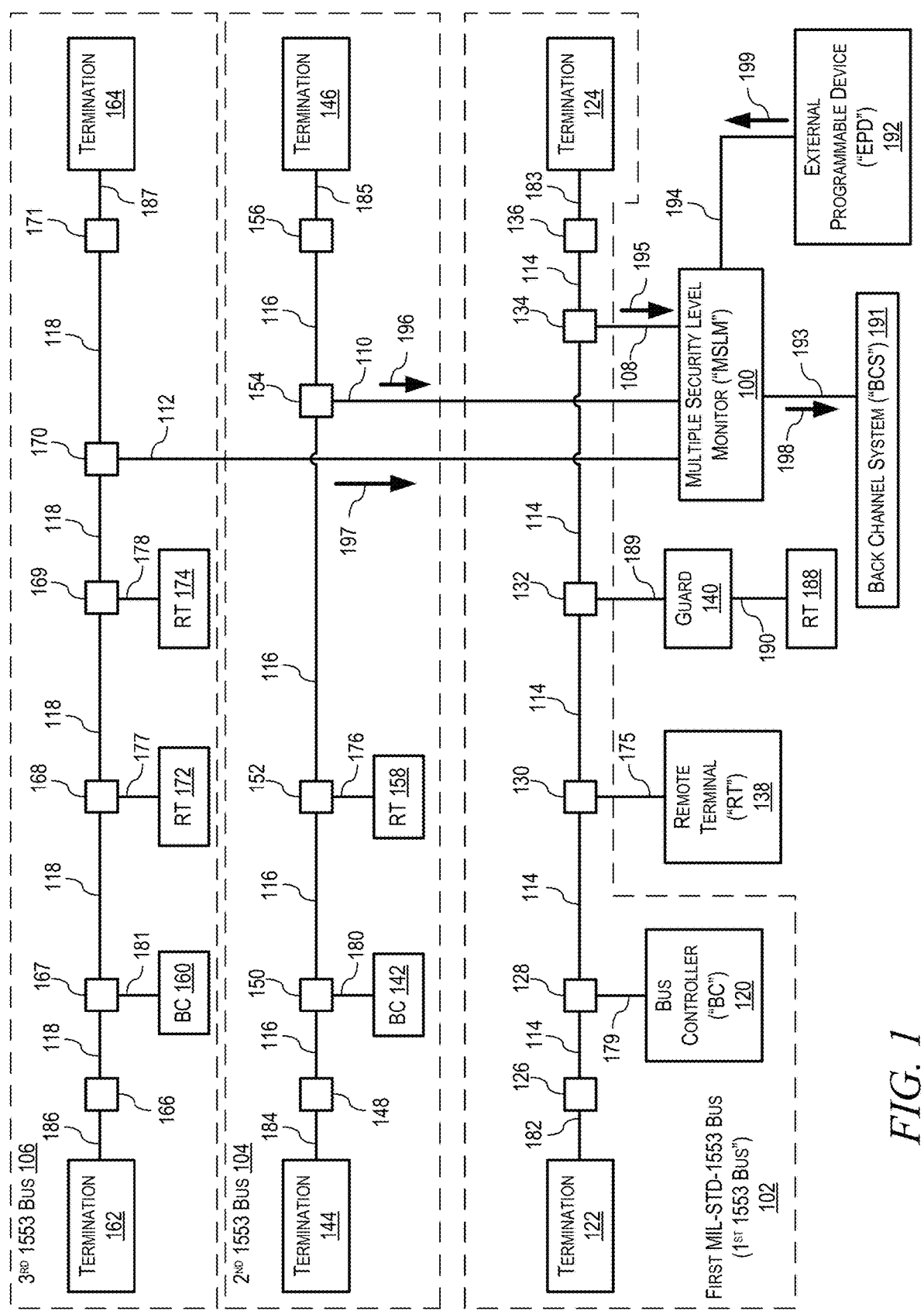
FIG. 1 is a system block diagram of an example of an implementation of a Multiple Security Level Monitor ("MSLM") for monitoring a plurality of MIL-STD-1553 buses having at least one security level in accordance with the present disclosure.

Disclosed is a Multiple Security Level Monitor ("MSLM") for monitoring a plurality of MIL-STD-1553 data buses ("1553 buses") having at least one security level. The MSLM includes a system high processing device ("SHPD") and a plurality of bus data monitors ("BDMs"). Each BDM of the plurality of BDMs is in signal communication with the SHPD via a plurality of signal paths that are separate from the plurality of 1553 buses. The plurality of BDMs have at least a first BDM and a second BDM. The first BDM is in signal communication with a first 1553 bus having a first security level, where the signal communication is only in a receive mode from the first 1553 bus to the first BDM. The second BDM is in signal communication with a second 1553 bus having a second security level, where the signal communication is only in a receive mode from the second 1553 bus to the second BDM. The SHPD has a third security level that is equal to or higher than the first security level and the second security level and the SHPD is configured to control the plurality of BDMs. The SHPD includes a network interface configured to communicate at the third security level with a back channel system ("BCS") that is separate from the MSLM and the BCS is in signal communication with the SHPD via a signal path that is separate from the plurality of 1553 buses.

Also disclosed is another MSLM for monitoring a plurality of 1553 buses having different security levels. The MSLM includes a first, second, and third stovepipe systems. The first stovepipe system includes a first processor, a first 1553 device interface, and a first virtual machine ("VM") partition. The second stovepipe system includes a second processor, a second 1553 device interface, and a second VM partition. The third stovepipe system includes a third processor, a network interface, and a third VM partition. The first 1553 device interface is in signal communication with a first 1553 bus and the signal communication is only in a receive mode from the first 1553 bus to the first stovepipe system; the first 1553 bus has a first security level, the second 1553 device interface is in signal communication with a second 1553 bus and the signal communication is only in a receive mode from the second 1553 bus to the second stovepipe system; and the third stovepipe system is configured to control the first stovepipe system and the second stovepipe system. The network interface is configured to communicate at a third security level with a BCS that is separate from the MSLM and the BCS is in signal communication with the third stovepipe system via a signal path that is separate from the plurality of 1553 buses. The MSLM also includes a hypervisor and a shared memory, where the hypervisor and shared memory are in signal communication with the first stovepipe system, second stovepipe system, and third stovepipe system.

In an example of operation, the MSLM performs a method that includes receiving a first bus data from the first 1553 bus in signal communication with the first BDM and receiving a second bus data from the second 1553 bus in signal communication with the second BDM. The method further includes monitoring the first bus data to determine if the first bus data violates a first rule set and monitoring the second bus data to determine if the second bus data violates a second rule set. Moreover, the method includes transmitting the first bus data to the SHPD if the first bus data violates the first rule set and transmitting the second bus data to the SHPD if the second bus data violates the second rule set. The method then includes analyzing either the first bus data or the second bus data with the SHPD and transmitting a SHPD output data to the BCS, based on the results of analyzing either the first bus data or the second bus data, where the SHPD output data has a third security level that is equal to or higher than the first security level and the second security level. The SHPD output data is transmitted to the BCS via the network interface that is separate from the first 1553 bus and second 1553 bus.

In general, the MSLM allows for the monitoring of multiple 1553 buses that are operating at different security levels. For example, if the MSLM is monitoring three 1553 buses, the first 1553 bus may be at a first security level (for example, a confidential security level), the second 1553 bus may be at a second security level (for example, a secret security level), and the third 1553 bus may be at a third security level (for example, a top secret security level). Alternatively, the first 1553 bus may be at a first security level that is unsecure (i.e., with no security level since no classified information or data will be passed on this bus) and the second and third 1553 buses may pass classified information at other security levels (such as, secret or top secret). Moreover, some of the security levels may be at security levels that are independent of the standard confidential, secret, and top secret security levels and correspond to security levels of other government agencies.

While monitoring these multiple 1553 buses having varying security levels for some of the different 1553 buses, the MSLM is configured to not allow different security level classified information and/or data to be accidently mixed between the different 1553 buses. For example, if the first 1553 bus is a non-classified 1553 bus that does not pass any classified information and/or data, the second 1553 bus is a top-secret classified 1553 bus that passes classified information that is at a top-secret security level, and the third 1553 bus is a classified 1553 bus that passes classified information that is at a secret security level, the MSLM is configured to absolutely not allow any information and/or data from either the second or third 1553 bus to be accidently transmitted to the first 1553 bus. Additionally, the MSLM is also configured to not allow any top secret information and/or data from the second 1553 bus to be accidently transmitted to the second 1553 bus that is at a lower secret security level. The MSLM is configured to accomplish this by configuring the MSLM to only receive bus data from either the first 1553 bus, second 1553 bus, or third 1553 bus but not transmit any data to any 1553 buses. In this example, the output communication from the MSLM is limited to communicating with the BCS via a signal path that is independent and separate from any of the 1553 buses that are being monitored by the MSLM.

More specifically, in FIG. 1, a system block diagram is shown of an example of an implementation of the MSLM 100 for monitoring a plurality of 1553 buses having at least one security level in accordance with the present disclosure. The MSLM 100 is in signal communication with a first 1553 bus 102, second 1553 bus 104, and third 1553 bus 106 via signal paths 108, 110, and 112, respectively. In general, the 1553 buses 102, 104, and 106 are data buses utilizing a military standard that defines the electrical and protocol characteristics for a serial data bus. Generally, a data bus is utilized to provide a medium for the exchange of data and information between various systems. The 1553 buses 102, 104, and 106 are similar to what the personal computer and office automation industry has dubbed a Local Area Network ("LAN"). The 1553 buses 102, 104, and 106 include a dual redundant balanced line physical layer, employ time division multiplexing, and support a half-duplex command/response protocol. For a 1553 bus, by definition, a plurality of remote terminals ("RTs") or devices, such as, for example, up to 31 RTs or devices, may be in signal communication with the 1553 bus so as to communicate over the 1553 bus. In this example, for purposes of illustration there are three 1553 buses 102, 104, and 106 shown; however, it is appreciated by those of ordinary skill in the art that any plurality of 1553 buses may be utilized ranging from two 1553 buses to "n" number of 1553 buses, where n represents the implementation limitations of the MSLM 100.

In this example, the 1553 buses 102, 104, and 106 include twinaxial cables 114, 116, and 118, respectively, having two conductors with a coaxial cable construction with a center conductor and an inner shield surrounding the center conductor and separated from the center conductor by insulation. In this example, the first 1553 bus 102 includes a first bus controller ("BC") 120, a first termination 122, a second termination 124, and a plurality of connection stubs 126, 128, 130, 132, 134, and 136 that are in signal communication with the BC 120, first termination 122, second termination 124, a first RT 138, a guard 140, and the MSLM 100. Similarly, the second 1553 bus 104 includes a second BC 142, a third termination 144, a fourth termination 146, and a plurality of connection stubs 148, 150, 152, 154, and 156 that are in signal communication with the second BC 142, third termination 144, fourth termination 146, a second RT 158, and the MSLM 100. Moreover, the third 1553 bus 106 includes a third BC 160, a fifth termination 162, a sixth termination 164, and a plurality of connection stubs 166, 167, 168, 169, 170, and 171 that are in signal communication with the fifth termination 162, third BC 160, a third RT 172, a fourth RT 174, the MSLM 100, and the sixth termination 164. Per the MIL-STD-1553 standards, the connection stubs 126, 128, 130, 132, 134, 136, 148, 150, 152, 154, 156, 166, 167, 168, 169, 170, and 171 are couplers that are in signal communication with external devices (such as, for example, RTs 138, 158, 172, and 174, BCs 120, 142, and 160, and terminations 122, 124, 144, 146, 162, and 164, respectively) either via transformer coupled stubs or direct coupled stubs.

In this example, the first RT 138, second RT 158, third RT 172, fourth RT 174, first BC 120, second BC 142, third BC 160, first termination 122, second termination 124, third termination 144, fourth termination 146, fifth termination 162, and sixth termination 164 may be in signal communication with connection stubs 130, 152, 168, 169, 128, 150, 167, 126, 136, 148, 156, 166, and 171 via signal paths 175, 176, 177, 178, 179, 180, 181, 182, 183, 184, 185, 186, and 187, respectively. Moreover, the guard 140 is in signal communication connection stub 132 and a fifth RT 188 via signal path 189 and 190, respectively. Furthermore, the MSLM 100 is signal communication a back channel system ("BCS") 191 and may be in signal communication with an external programmable device ("EPD") 192 via signal paths 193 and 194, respectively.

The first, second, and third BCs 120, 142, and 160 are controller devices that each includes one or more processors (not shown) and initiates all the message communication over the first, second, and third 1553 buses 102, 104, and 106, respectively. It is appreciated by those of ordinary skill in the art that the BCs, and operation thereof, are defined by the MIL-STD-1553 standard. As such, based on the MIL-STD-1553 standard, there is only one BC at a time on any 1553 bus and the BC initiates all message communication over the 1553 bus that the BC is controlling. Generally, the BC: operates according to a command listed stored in its local memory (i.e., the corresponding computer-readable medium); commands the various RTs to send or receive messages; services any requests that BC receives from the RTs; detects and recovers from errors; and keeps a history of errors.

The first, second, third, and fourth RTs 138, 158, 172, and 174 are devices that may be components, systems, or circuits that either communicate directly with the first, second, or third 1553 buses 102, 104, or 106, respectively, or act as a bridge between the first, second, or third 1553 buses 102, 104, or 106 and another 1553 bus (not shown) or subsystem. Again, RTs are defined by the MIL-STD-1553 standard and generally are utilized to provide an interface between the 1553 bus and an attached subsystem and/or a bridge between a first 1553 bus and another 1553 bus. For example, in a tracked vehicle, a first RT might acquire data from an inertial navigational subsystem and send that data over a 1553 data bus to another RT for display on a flight display for the crew. Other examples of RTs might be interfaces that switch on the headlights, the landing lights, or the annunciators in an aircraft. Moreover, the one or more RT may be vehicle payload devices, navigation system, communication system, radar system, inertial sensors, interfaces for headlights, landing lights, or annunciators, etc.

The first, second, third, fourth, fifth, and sixth terminations 122, 124, 144, 146, 162, and 164 are generally cable terminations as defined by the MIL-STD-1553 standard. The purpose of the electrical first, second, third, fourth, fifth, and sixth terminations 122, 124, 144, 146, 162, and 164 is to minimize the effects of signal reflections that may cause waveform distortion that may result in disruption or intermittent communication failures along a given 1553 bus. As an example, the guard 140 connects the fifth RT 188 to the first 1553 bus 102 via signal paths 189 and 190 and connection stub 132. The guard 140 is a device, component, circuit, subsystem, or module that monitors and protects the data either from the first 1553 bus or the fifth RT 188, or both.

It is appreciated by those skilled in the art that the circuits, components, modules, and/or devices of, or associated with, the MSLM 100 and the first, second, and third 1553 buses 102, 104, and 106 are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

As an example of operation, the MSLM 100 receives a first bus data 195 from the first 1553 bus 102, a second bus data 196 from the second 1553 bus 104, and a third bus data 197 from the third 1553 bus 106. In this example, the first 1553 bus 102 is operating at a first security level that may be, for example, unclassified, confidential, secret, top secret, or other security levels. Similarly, the second 1553 bus 104 is operating at a second security level that may also be, for example, unclassified, confidential, secret, top secret, or other security levels. Further, the third 1553 bus 106 is operating at a third security level that may also be, for example, unclassified, confidential, secret, top secret, or other security levels. If any of the three security levels of the first, second, and third 1553 buses 102, 104, and 106 is different, then at least one of the first, second, and third 1553 buses 102, 104, and 106 is operating at a security level that is either higher or lower than the other security levels of the other 1553 buses and the MSLM 100 must guarantee that the bus data from the different buses having different security levels are not passed to a 1553 bus having a lower security level. The MSLM 100 accomplishes this by only receiving the bus data 195, 196, and 197 from the first, second, and third 1553 buses 102, 104, and 106. The MSLM 100 does not transmit any data back to any of the 1553 buses 102, 104, and 106. Once the MSLM 100 receives the first, second, and third bus data 195, 196, and 197, the MSLM 100 monitors the first bus data 195 to see if the first bus data 195 violates a first rule set, the second bus data 196 to see if the second bus data 196 violates a second rule set, and the third bus data 197 to see if the third bus data 197 violates a third rule set. If the first, second, or third bus data 195, 196, or 197 violates the first, second, or third rule set, the MSLM 100 analyzes the first, second, or third bus data 195, 196, or 197 and the results of the analysis are transmitted, as an MSLM output signal 198, to the BCS 191, via signal path 193, at a security level that is at least a high, if not higher, than the highest security level of the first, second, and third security levels of the first, second, and third 1553 buses 102, 104, and 106. The signal path 193 between the MSLM 100 and BCS 191 is separate and independent from the first, second, and third 1553 buses 102, 104, and 106 and is at a security level that is at least as high as either the first, second, or third security levels of the first, second, and third 1553 buses 102, 104, and 106.

In this example, the first, second, and third rule sets may be accessed from one or more computer files 199 that are loaded on to a computer-readable medium within the MSLM 100 from the EPD. The EPD 192 may be an external processing device such as, for example, a computer, controller, or processor, an external system having a processor, permanent or detachable memory device, or other equivalent system capable of storing the one or more computer files 199 and transmitting it to the MSLM 100. The one or more computer files 199 may utilize any type of computer format such as, for example, an Extensible Markup Language ("XML") format or JavaScript Object Notation ("JSON") format.

As will be discussed later, the MSLM 100 includes at least two BDMs (not shown) and a SHPD (not shown). The BDMs are in signal communication with the first, second, and third 1553 buses 102, 104, and 106 and the SHPD is in signal communication with the BCS 191. More specifically, in FIG. 2, a system block diagram is shown of an example of an implementation of the MSLM 100 in accordance with the present disclosure.

In this example, the MSLM 100 includes a first BDM 200, a second BDM 202, third BDM 204, and the SHPD 206. The first BDM 200 includes a first one or more processor units 208, a first computer-readable medium 210, a first data store 212, and a first computer file 214. The second BDM 202 includes a second one or more processor units 216, a second computer-readable medium 218, a second data store 220, and a second computer file 222. The third BDM 204 includes a third one or more processor units 224, a third computer-readable medium 226, a third data store 228, and a third computer file 230. The SHPD 206 includes a fourth one or more processor units 232, a fourth computer-readable medium 234, and a fourth data store 236.

With regards to the first BDM 200, the first computer-readable medium 210 has encoded thereon computer-executable instructions that cause the first one or more processors units 208 to receive the first bus data 195 from the first 1553 bus 102, access a rule set from the first computer file 214 stored on the first computer-readable medium 210, compare the received first bus data 195 against the first rule set, and determine if the received first bus data 195 violates any sub-rules defined in the first rule set, where the first rule set includes a plurality of defined sub-rules.

In this example, the first computer-readable media 210 includes the first data store 212 in which the first computer file 214 is stored. The first data store 212 may include data storage such as, for example, a database, data warehouse, or other type of structured or unstructured data storage. Additionally, the first data store 212 may include a corpus and/or a relational database with one or more tables, indices, stored procedures, and so forth to enable data access including one or more of hypertext markup language ("HTML") tables, resource description framework ("RDF") tables, web ontology language ("OWL") tables, and/or XML tables, for example. Moreover, the first data store 212 may store data for the operations of processes, applications, components, and/or modules stored in the first computer-readable media 210 and/or executed by the first one or more processing units 208. Furthermore, the first computer-readable media 210 may also include an operating system ("OS") and application programming interface(s) ("APIs") configured to expose the functionality and the received first bus data 195 or first output data 238 of the first BDM 200 to an external device (i.e., the SHPD 206) associated with the first BDM 200 via a first signal path 240 that is separate and independent of the first, second, and third 1553 buses 102, 104, and 106.

Similarly, with regards to the second BDM 202, the second computer-readable medium 218 has encoded thereon computer-executable instructions that cause the second one or more processors units 216 to receive the second bus data 196 from the second 1553 bus 104, access a second rule set from the second computer file 222 stored on the second computer-readable medium 218, compare the received second bus data 196 against the second rule set, and determine if the received second bus data 196 violates any sub-rules defined in the second rule set, where the second rule set includes a plurality of defined sub-rules.

In this example, the second computer-readable media 218 includes the second data store 220 in which the second computer file 222 is stored. The second data store 220 may include data storage such as, for example, a database, data warehouse, or other type of structured or unstructured data storage. Additionally, the second data store 220 may include a corpus and/or a relational database with one or more tables, indices, stored procedures, and so forth to enable data access including one or more of HTML tables, RDF tables, OWL tables, and/or XML tables, for example. Moreover, the second data store 220 may store data for the operations of processes, applications, components, and/or modules stored in the second computer-readable media 218 and/or executed by the second one or more processing units 216. Furthermore, the second computer-readable media 210 may also include an OS and APIs configured to expose the functionality and the received second bus data 196 or second output data 242 of the second BDM 202 to the SHPD 206 via a second signal path 244 that is also separate and independent of the first, second, and third 1553 buses 102, 104, and 106.

Moreover, with regards to the third BDM 204, the third computer-readable medium 226 has encoded thereon computer-executable instructions that cause the third one or more processors units 224 to receive the third bus data 197 from the third 1553 bus 106, access a third rule set from the third computer file 230 stored on the third computer-readable medium 226, compare the received third bus data 197 against the third rule set, and determine if the received third bus data 197 violates any sub-rules defined in the third rule set, where the third rule set includes a plurality of defined sub-rules.

In this example, the third computer-readable media 226 includes the third data store 228 in which the third computer file 230 is stored. Again, the third data store 228 may include data storage such as, for example, a database, data warehouse, or other type of structured or unstructured data storage. Additionally, the third data store 228 may include a corpus and/or a relational database with one or more tables, indices, stored procedures, and so forth to enable data access including one or more of HTML tables, RDF tables, OWL tables, and/or XML tables, for example. Moreover, the third data store 228 may store data for the operations of processes, applications, components, and/or modules stored in the third computer-readable media 226 and/or executed by the third one or more processing units 224. Furthermore, the third computer-readable media 226 may also include an OS and APIs configured to expose the functionality and the received third bus data 197 or third output data 246 of the third BDM 204 to the SHPD 206 via a third signal path 248 that is also separate and independent of the first, second, and third 1553 buses 102, 104, and 106.

In this example, the first, second, and third signal paths between the first, second, and third BDMs and the SHPD 206 is an MSLM 100 internal bus 250 that is separate, independent, and not in signal communication with any of the first, second, and third 1553 buses 102, 104, and 106. An example of an implementation of the MSLM 100 internal bus 250 may be an Ethernet bus that allows for two-way communication between the SHPD 206 and the first, second, and third BDMs 200, 202, and 204. Alternatively, each signal path 240, 244, and 248 from the first, second, and third BDMs 200, 202, and 204 may be independently connected individual signal paths to the SHPD 206. Since in this example, the first, second, and third BDMs 200, 202, and 204 can only receive the first, second, and third bus data 195, 196, and 197, respectively, and cannot transmit any information or data back to the first, second, or third 1553 buses 102, 104, and 106, the MSLM 100 is guaranteed to not accidently transmit data at the wrong classification security level to the wrong 1553 bus. All BDMs output data 238, 242, and 246 are exclusively transmitted to the SHPD 206 via signal paths 240, 244, and 248 that are separate and independent to the first, second, and third 1553 buses 102, 104, and 106.

In this example, the first, second, and third computer files 214, 222, and 230 are dynamically loadable first, second, and third rule file sets, respectively, and the first, second, and third computer-readable mediums 210, 218, and 226 includes a plurality of dynamically loadable rule file sets to alter the operation of the first, second, and third BDMs 200, 202, and 204, respectively, during operation. Additionally, in this example, the first, second, and third computer files 214, 222, and 230 are loaded on the respective first, second, and third BDM 200, 202, and 204 from an external device that may be either the SHPD 206 or the EPD 192 that is in signal communication with the MSLM 100 via the signal paths 240 or 194, respectively. If the first, second, and third computer files 214, 222, and 230 are loaded onto the first, second, and third data stores 212, 220, and 228 from the SHPD 206, the SHPD 206 may transmit the first, second, and third computer files 214, 222, and 230 to the first, second, and third data stores 212, 220, and 228 via the first, second, and third signal paths 240, 244, and 248, respectively. If, instead, the first, second, and third computer files 214, 222, and 230 are loaded onto the first, second, and third data stores 212, 220, and 228 from the EPD 192, the EPD 192 may transmit the first, second, and third computer files 214, 222, and 230 to the first, second, and third data stores 212, 220, and 228 as the one or more computer files 199 via the signal path 194.

Alternatively, the first, second, and third computer files 214, 222, and 230 may be loaded from the EPD 192 to the data store 236 on the SHPD 206 (shown as the first, second, and third computer files 214, 222, and 230 within data store 236). In this example, the SHPD 206 is configured to distribute the individual computer files 214, 222, and 230 to the individual BDMs 200, 202, and 204. As an example, a larger combined rule file (as the one or more computer files 199) may be loaded on to the data store 236 of the SHPD 206. The SHPD 206 is then configured to divide the combined rule file into the individual first, second, and third computer files 214, 222, and 230 which are transmitted to the first, second, and third BDMs 200, 202, and 204, respectively. In this example, by having copies of the computer files 214, 222, and 230, the SHPD is capable of preforming deep packet inspection of the first, second, and third outputs 238, 242, and 246 from the first, second, and third BDMs 200, 202, and 204, respectively.

In this example, the EPD 192 may be an external processing device such as, for example, a computer, controller, or processor, an external system having a processor, permanent or detachable memory device, or other equivalent system capable of storing the first, second, and/or third computer files 214, 222, and 230 and transmitting them to the first, second, or third BDM 200, 202, or 204. The first, second, and third computer files 214, 222, and 230 may utilize any type of computer format such as, for example, an XML format or JSON format. Optionally, the first, second, and third computer files 214, 222, and 230 may the same computer file or different computer files based on the rules that need to be applied to the different 1553 buses 102, 104, and 106.

As discussed earlier, the first, second, and third BDM 200, 202, and 204 are in signal communication with the SHPD 206, which is a separate processing device, via signal paths 240, 244, and 248, respectively, which is separate and independent of the first, second, and third 1553 buses 102, 104, and 106. The SHPD 206 includes the one or more processors 232 and fourth computer-readable medium 234. The fourth computer-readable medium 234 includes the fourth data store 236.

In an example of operation, the first BDM 200 may receive the first bus data 195 from the first 1553 bus 102, access the first rule set from the first computer file 214, compare the received first bus data 195 against the first rule set, and determine if the received first bus data 195 violates any sub-rules defined in the first rule set. Once the first BDM 200 determines that a violation of sub-rule has occurred, the received first bus data 195 (or a modified version of the received first bus data 195) is transmitted to the SHPD 206, via the first signal path 240, as the first output data 238.

Once the SHPD 206 receives the first output data 238, the fourth computer-readable medium 234 includes computer-executable instructions loaded in the fourth computer-readable medium 234 that cause the fourth one or more processing units 232 to analyze the first output data 238 (which may be a modified or unmodified version of the first bus data 195) that has been determined to violate a sub-rule of the sub-rules defined in the first rule set within the first computer file 214, determine a sub-system (for example, RT 138 or RT 188) that the received first bus data 195 is intended for, attribute a risk level based on the violated sub-rule and the sub-system, and perform a deep packet inspection of the received first bus data 195 based on the risk level and sub-system. The results of this analysis are then transmitted by the SHPD 206 to the BCS 191 via signal path 193 as the MSLM output signal 198. Where the signal path 193 is a backchannel signal path that is separate and independent of the first, second, or third 1553 buses 102, 104, and 106. Moreover, the SHPD 206, BCS 191, and the signal path 193 between the SHPD 206 and BCS 191 are operating at a security level that is at least as high as the highest security level of either the first, second, or third 1553 buses 102, 104, and 106. In this example, the BCS 191 may be a central computer, flight control system, secure on-board computer system, etc. As discussed earlier, in this example, the SHPD 206 is an external system or sub-system separate from the first BDM 200 but within the MSLM 100.

Similarly, the second BDM 202 may receive the second bus data 196 from the second 1553 bus 104, access the second rule set from the second computer file 222, compare the received second bus data 196 against the second rule set, and determine if the received second bus data 196 violates any sub-rules defined in the second rule set. Once the second BDM 202 determines that a violation of sub-rule has occurred, the received second bus data 196 (or a modified version of the received second bus data 196) is transmitted to the SHPD 206, via the second signal path 244, as the second output data 242.

Once the SHPD 206 receives the second output data 242, the fourth computer-readable medium 234 includes computer-executable instructions loaded in the fourth computer-readable medium 234 that cause the fourth one or more processing units 232 to analyze the second output data 242 (which may be a modified or unmodified version of the second bus data 196) that has been determined to violate a sub-rule of the sub-rules defined in the second rule set within the second computer file 222, determine a sub-system (for example, RT 158) that the received second bus data 196 is intended for, attribute a risk level based on the violated sub-rule and the sub-system, and perform a deep packet inspection of the received second bus data 196 based on the risk level and sub-system. Again, the results of this analysis are then transmitted by the SHPD 206 to the BCS 191 via signal path 193 as the MSLM output signal 198. Where the signal path 193 is a backchannel signal path that is separate and independent of the first, second, or third 1553 buses 102, 104, and 106. Moreover, the SHPD 206, BCS 191, and the signal path 193 between the SHPD 206 and BCS 191 are operating at a security level that is at least as high as the highest security level of either the first, second, or third 1553 buses 102, 104, and 106. As discussed earlier, in this example, the SHPD 206 is an external system or sub-system separate from the second BDM 202 but within the MSLM 100.

Moreover, the third BDM 204 may receive the third bus data 197 from the third 1553 bus 106, access the third rule set from the third computer file 230, compare the received third bus data 197 against the third rule set, and determine if the received third bus data 197 violates any sub-rules defined in the third rule set. Once the third BDM 204 determines that a violation of sub-rule has occurred, the received third bus data 197 (or a modified version of the received third bus data 197) is transmitted to the SHPD 206, via the third signal path 248, as the third output data 246.

Similar to the description above, once the SHPD 206 receives the third output data 246, the fourth computer-readable medium 234 includes computer-executable instructions loaded in the fourth computer-readable medium 234 that cause the fourth one or more processing units 232 to analyze the third output data 246 (which may be a modified or unmodified version of the third bus data 197) that has been determined to violate a sub-rule of the sub-rules defined in the third rule set within the third computer file 230, determine a sub-system (for example, RT 172 or RT 174) that the received third bus data 197 is intended for, attribute a risk level based on the violated sub-rule and the sub-system, and perform a deep packet inspection of the received third bus data 197 based on the risk level and sub-system. Again, the results of this analysis are then transmitted by the SHPD 206 to the BCS 191 via signal path 193 as the MSLM output signal 198. Where the signal path 193 is a backchannel signal path that is separate and independent of the first, second, or third 1553 buses 102, 104, and 106. Moreover, the SHPD 206, BCS 191, and the signal path 193 between the SHPD 206 and BCS 191 are operating at a security level that is at least as high as the highest security level of either the first, second, or third 1553 buses 102, 104, and 106. As discussed earlier, in this example, the SHPD 206 is an external system or sub-system separate from the second BDM 202 but within the MSLM 100.

In these examples, the first, second, and third BDMs 200, 202, and 204 utilize a defined set of rules that define the normal bus behavior of either the first, second, or third 1553 bus 102, 104, and 106, where the set of rules (i.e., first, second, and third rule set) are defined by the first, second, and third computer files 214, 222, and 230. Utilizing these set of rules, the first, second, and third BDMs 200, 202, and 204 monitor the behavior of the first, second, or third 1553 bus 102, 104, and 106 for any abnormal bus behavior.

As disclosed earlier, the first, second, or third BDMs 200, 202, and 204 determine that the first, second, or third 1553 bus 102, 104, and 106 are behaving in an abnormal way, respectively, when the received first, second, or third bus data 195, 196, or 197 from the first, second, or third 1553 bus 102, 104, and 106, respectively, violates any of the corresponding sub-rules defined in the first, second, or third rule set. If the either the first, second, or third BDM 200, 202, or 204 determines that the first, second, or third 1553 bus 102, 104, or 106 is behaving in an abnormal way, the first, second, or third BDM 200, 202, or 204 notifies and transmits the first, second, or third output data 238, 242, or 246 to SHPD 206 through first, second, or third signal path 240, 244, or 248, which is back channel signal path—i.e., a communication path that is separate and independent of the first, second, or third 1553 bus 102, 104, or 106. If the first, second, or third BDM 200, 202, or 204 transmits a first, second, or third output data 238, 242, or 246 to the SHPD 206, the SHPD 206 then performs the additional analysis on the first, second, or third output data output data 238, 242, or 246 corresponding to the received first, second, or third bus data 195, 196, or 197 from the first, second, or third 1553 bus 102, 104, or 106. In this example, the first, second, and third BDM 200, 202, and 204 may also monitor and provide constant bus status of the first, second, and third 1553 bus 102, 104, or 106 to the SHPD 206.

It is further appreciated by those of ordinary skill in the art that the first, second, third, and fourth one or more processing units 208, 216, 224, and 232 shown in the first, second, and third BDM 200, 202, and 204 and the SHPD 206 respectively, may operate in a cluster or other grouped configuration to share resources, balance load, increase performance, provide fail-over support or redundancy, or for other purposes. In general, the first, second, third, and fourth one or more processing units 208, 216, 224, and 232 shown in the first, second, and third BDM 200, 202, and 204 and the SHPD 206, respectively, may be computing devices that belong to a variety of classes of devices, which may be the same as, or different from each other. Examples of the computing devices include client-type devices, payload systems with computing devices, controllers, and special purpose-type devices. More specifically, the first, second, third, and fourth one or more processing units 208, 216, 224, and 232 shown in the first, second, and third BDM 200, 202, and 204 and the SHPD 206, respectively, may represent, for example, a Central Processing Unit ("CPU") type processing unit, a Graphics Processing Unit ("GPU") type processing unit, a Field-programmable Gate Array ("FPGA"), another class of Digital Signal Processor ("DSP"), other hardware logic components that may, in some instances, be driven by a CPU, or combination of these computing devices. For example, and without limitation, examples of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, a computer-readable media or medium, such as first, second, third, or fourth computer-readable medium 210, 218, 226, or 234, may store instructions executable by the first, second, third, and fourth one or more processing units 208, 216, 224, and 232. The computer-readable medium may also store instructions executable by external processing units (such as the fourth one or more processors 232 in the SHPD 206) such as by an external CPU, an external GPU, and/or executable by an external accelerator, such as an FPGA type accelerator, a DSP type accelerator, or any other internal or external accelerator. In some examples, at least one CPU, GPU, and/or accelerator may be incorporated in either the first, second, or third BDMs 200, 202, or 204 or the SHPD 206, while in some examples one or more of a CPU, GPU, and/or accelerator may be external to the first, second, and third BDM 200, 202, and 204 and the SHPD 206.

In this disclosure, the first, second, third, or fourth computer-readable medium 210, 218, 226, or 234 may include computer storage media and/or communication media. The computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, the computer storage media may include tangible and/or physical forms of media included in first, second, or third BDM 200, 202, and 204 or the SHPD 206 and/or hardware component that is part of the first, second, or third BDM 200, 202, and 204 or the SHPD 206 or is external to the first, second, or third BDM 200, 202, and 204 or the SHPD 206, including but not limited to random-access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

As discussed earlier, the first, second, third, and fourth computer-readable mediums 210, 218, 226, and 234 include first, second, third, and fourth data stores 212, 220, 228, and 236, respectively. The first, second, third, and fourth data stores 212, 220, 228, and 236 may include data storage such as, for example, a database, data warehouse, or other type of structured or unstructured data storage. Additionally, each of the first, second, third, and fourth data stores 212, 220, 228, and 236 may include a corpus and/or a relational database with one or more tables, indices, stored procedures, and so forth to enable data access including one or more of HTML tables, RDF tables, OWL tables, and/or XML tables, for example. Moreover, each of the first, second, third, and fourth data stores 212, 220, 228, and 236 may store data for the operations of processes, applications, components, and/or modules stored in the first, second, third, and fourth computer-readable mediums 210, 218, 226, and 234, respectively, and/or executed by the first, second, third, or fourth one or more processing units 208, 216, 224, or 232, respectively, and/or accelerator(s). Furthermore, each computer-readable medium 210, 218, 226, and 234 may also include an OS and API(s) configured to expose the functionality and the received first, second, or third bus data 195, 196, or 197 or first, second, or third output data 238, 242, or 246 of the first, second, or third BDM 200, 202, or 204 or the MSLM output signal of the SHPD 206 to external devices (e.g., BCS 191) associated with either the first, second, or third BDM 200, 202, or 204 or the MSLM output signal of the SHPD 206. However, in all of these examples, the data and information gathered within the first, second, or third BDM 200, 202, or 204 is passed first through the SHPD 206 that solely communicates with any external devices (e.g., BCS 191) through the signal path 193 that is at a security level that is at least as high as the highest security level of the first, second, and third bus data 195, 196, or 197 that corresponds to the corresponding first, second, or third 1553 buses 102, 104, or 106. In no event, is any of data and/or information from the first, second, and third bus data 195, 196, or 197 transmitted back to any of the first, second, or third 1553 buses 102, 104, or 106.

Figure 2:
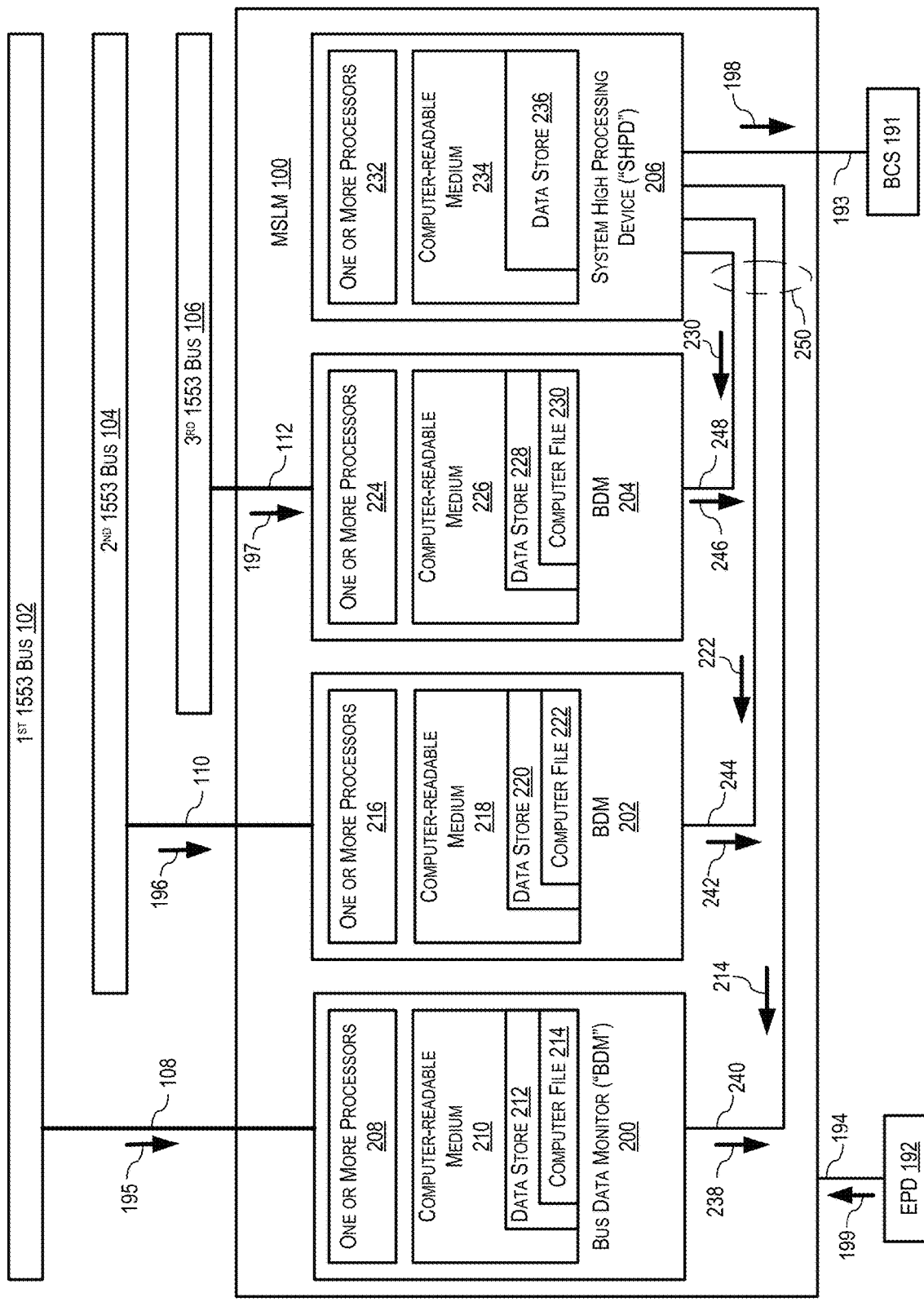
FIG. 2 is a system block diagram of an example of an implementation of the MSLM, shown in FIG. 1, in accordance with the present disclosure.
Figure 3:
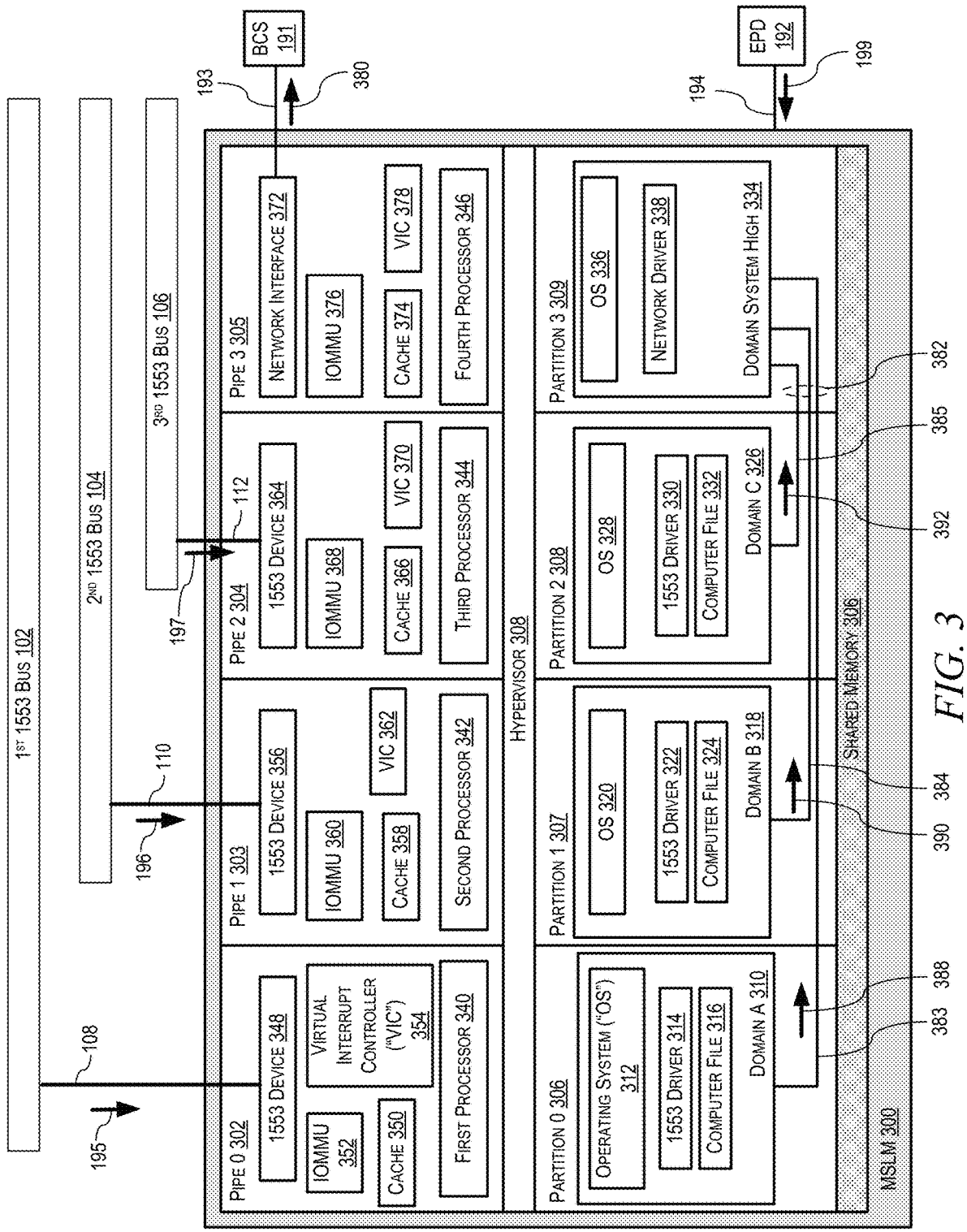
FIG. 3 is a system block diagram of an example of another implementation of the MSLM, shown in FIG. 1, in accordance with the present disclosure.

Turning to FIG. 3, a system block diagram of an example of another implementation of the MSLM 300 is shown in accordance with the present disclosure. In this example, the MSLM 300 includes four stovepipe systems defined as pipe 0 302, pipe 1 303, pipe 2 304, and pipe 3 305. The pipe 0 302, pipe 1 303, pipe 2 304, and pipe 3 305 are stovepipe systems because they have the potential to share data or functionality with each other but do not; however, in this example, it is assumed that pipe 0 302, pipe 1 303, pipe 2 304, and pipe 3 305 do not share data in order to assure a high level of security. However, it is appreciated that by those of ordinary skill in the art that even if some data where to be shared then end result is that it will only transmitted from the MSLM 300 via a back channel signal path having a high security level that will be described shortly In this example, the pipe 0 302 functionally corresponds to the first BDM 200 shown in FIG. 2, i.e., pipe 0 302 is an implementation of system that operates either functionally approximately the same or is very similar to manner in which the BDM 200 operates. Similarly, the pipe 1 302 functionally corresponds to the second BDM 202 and the pipe 2 304 functionally corresponds to the third BDM 204. Moreover, the pipe 3 305 functionally corresponds to the SHPD 206.

The MSLM 300 also includes a shared memory 395 and hypervisor 396 where both the shared memory 395 and hypervisor 396 are in signal communication with the pipe 0 302, pipe 1 303, pipe 2 304, and pipe 3 305, which (as mentioned previously) functionally correspond to the first, second, and third BDM 200, 202, and 204 and the SHPD 206, respectively. In this example, the pipe 0 302 is organized and operated as a virtual machine ("VM") that includes a first VM partition 306. Similarly, the pipe 1 303 is organized and operated as a VM that includes a second VM partition 307, the pipe 2 304 is organized and operated as a VM that includes a third VM partition 308, and the pipe 3 305 is organized and operated as a VM that includes a fourth VM partition 309. In this example, each of the VM partitions 306, 307, and 308 includes a VM domain that includes an OS, 1553 driver, and computer file, while VM partition 309 includes an OS 336, network interface 372, and computer file, but no 1553 driver. As such, the first VM partition 306 (shown as partition 0) includes a VM domain A 310 having a first OS 312, first 1553 driver 314, and first computer file 316 and the second VM partition 307 (shown as partition 1 307) includes a VM domain B 318 having a second OS 320, second 1553 driver 322, and second computer file 324. Similarly, the third VM partition 308 (shown as partition 2 308) includes a VM domain C 326 having a third OS 328, third 1553 driver 330, and third computer file 332, and the fourth VM partition 309 (shown as partition 3 309) includes a VM domain system high 334 having a fourth OS 336, and a network driver 338. In this example, the first, second, third, and fourth OS may be the same OS, such as, for example, LINUX.

In this example, it is appreciated by those of ordinary skill in the art that a VM is an emulation of a computer system and, as such, VMs are based on computer architectures and provide the functionality of a physical computer. There implementations may involve specialized hardware, software, or a combination of hardware and software. As such, it is appreciated by those of ordinary skill in the art that the first, second, and third BDMs 200, 202, and 204 and the SHPD 206 may be implemented functionally via the pipe 0 302, pipe 1 303, pipe 2 304, and pipe 3 305 utilizing the VM partition 0 306, VM partition 1 307, VM partition 2 308, VM partition 3 309, shared memory 395, and hypervisor 396.

In this example, the shared memory 395 is a physical memory/storage unit utilized by the pipe 0 302, pipe 1 303, pipe 2 304, and pipe 3 305. The shared memory 395 may include one or more types of volatile memory, nonvolatile memory, and/or other persistent and/or auxiliary computer storage media, removable and non-removable computer storage media implemented in any method or technology for storage of information such as computer-readable instructions, data structures, program modules, catch, or other data. Thus, the shared memory 395 may include tangible and/or physical forms of media included in the pipe 0 302, pipe 1 303, pipe 2 304, and pipe 3 305 and/or hardware component that is part of the pipe 0 302, pipe 1 303, pipe 2 304, and pipe 3 305 or is external to and accessible by the pipe 0 302, pipe 1 303, pipe 2 304, and pipe 3 305, including but not limited to RAM, SRAM, DRAM, PCM, ROM, EPROM, EEPROM, flash memory, CD-ROM, DVDs, optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

The hypervisor 396 is a virtual machine monitor that is well known to those of ordinary skill in the art. Generally, the hypervisor 396 includes computer software, firmware, or hardware that creates and runs the VMs of VM partition 0 306, VM partition 1 307, VM partition 2 308, and VM partition 3 309. In this example, the hypervisor 396 allows the MSLM 300 to utilize multiple processors to process the received first, second, and third bus data 195, 196, and 197 from the first, second, and third 1553 buses 102, 104, and 106. In this example, the MSLM 300 includes a first processor 340 within pipe 0 302, a second processor 342 within pipe 1 303, a third processor 344 within pipe 2 304, and a fourth processor 346 within pipe 3 305. The hypervisor 396 allows the VM partition 0 306, VM partition 1 307, VM partition 2 308, and VM partition 3 309 to utilize the first, second, third, and fourth processors 340, 342, 344, and 346 based on processing need of the different VM partitions. The hypervisor 396 also allows the VM partition 0 306, VM partition 1 307, VM partition 2 308, and VM partition 3 309 to utilize the shared memory 395 for use as computer-readable mediums for the OS 312, 320, 328, and 336 and the first, second, and third computer files 316, 324, and 332 in a similar functional fashion as previously described in relation to MSLM 100 described in FIG. 2.

In this example, the pipe 0 302, pipe 1 303, and pipe 2 304, also each include a 1553 device, a cache memory, an input-output memory management unit ("IOMMU"), and a virtual interrupt controller ("VIC"). Specifically, the pipe 1 302 also includes a first 1553 device 348 (i.e., a first 1553 device interface also known as a first 1553 interface device), first cache memory 350, first IOMMU 352, and first VIC 354 and the pipe 1 303 also includes a second 1553 device 356 (i.e., second 1553 device interface also known as a second 1553 interface device), second cache memory 358, second IOMMU 360, and second VIC 362. Similarly, the pipe 2 304 also includes a third 1553 device 364 (i.e., third 1553 device interface also known as a third 1553 interface device), third cache memory 366, third IOMMU 368, and third VIC 370. Moreover, pipe 3 305 also includes a network interface 372, fourth cache memory 374, fourth IOMMU 376, and fourth VIC 378. The first 1553 device 348 is in signal communication with the first 1553 bus 102 via signal path 108 and is configured to receive the first bus data 195. The second 1553 device 356 is in signal communication with the second 1553 bus 104 via signal path 110 and is configured to receive the second bus data 196 and the third 1553 device 364 is in signal communication with the third 1553 bus 106 via signal path 112 and is configured to receive the third bus data 197. The network interface 372 is in signal communication with the BCS 191 via signal path 193 and is configured to transmit a system high output signal 380 to the BCS 191. In this example, the system high output signal 380 corresponds to the MSLM output signal 198, shown in FIGS. 1 and 2.

The first, second, third, and fourth cache memories 350, 358, 366, and 374 may be typical cache memory types of devices that are well known by those of ordinary skill in the art. Generally, a cache memory is a fast and relatively small memory that is not visible to the software, controlled by the hardware of a device in which the cache memory is operating, and stores the most recently utilized data from a main memory (e.g., shared memory 395) or working memory. As such, it is appreciated by those of ordinary skill in the art that a purpose of the first, second, third, and fourth cache memories 350, 358, 366, and 374 is to increase performance by speeding up the shared memory 395 data access of the pipe 0 302, pipe 1 303, pipe 2 304, and pipe 3 305. Additionally, since the MSLM 300 is a multiprocessor system (having first, second, third, and fourth processors 340, 342, 344, and 346) with the shared memory 395, the first, second, third, and fourth cache memories 350, 358, 366, and 374 reduce the system bus 382 and shared memory 395 traffic between the pipe 0 302, pipe 1 303, pipe 2 304, and pipe 3 305. In this example, the system bus 382 includes a first, second, and third signal paths 383, 384, and 385. In this example, if the shared memory 395 utilizing DRAM technology, the first, second, third, and fourth cache memories 350, 358, 366, and 374 may utilize fast technology SRAM that are in direct signal communication (i.e., directly connected) with the first, second, third, and fourth processors 340, 342, 344, and 346, respectively, instead of the slower DRAM technology.

Turning to the first, second, third, and fourth IOMMU 352, 360, 368, and 376, an IOMMU is a memory management unit that connects a direct-memory-access-capable ("DMA-capable") input/out ("I/O") bus to the main memory (i.e., shared memory 395). The IOMMU maps device-visible addresses (i.e., device addresses or I/O addresses) to physical addresses. When an OS is running inside a VM, it does not usually know the host-physical addresses of memory that it accesses. As such, the first IOMMU 352 maps the I/O addresses of the pipe 0 302 to physical addresses such that the first OS 312 running inside the VM domain A 310 is able to access the host-physical addresses of the shared memory 395 and the second IOMMU 360 maps the I/O addresses of the pipe 1 303 to physical addresses such that the second OS 320 running inside the VM domain B 318 is also able to access the host-physical addresses of the shared memory 395. Similarly, the third IOMMU 368 maps the I/O addresses of the pipe 2 304 to physical addresses such that the third OS 328 running inside the VM domain C 326 is able to access the host-physical addresses of the shared memory 395 and the fourth IOMMU 376 maps the I/O addresses of the pipe 3 305 to physical addresses such that the fourth OS 336 running inside the VM domain system high 334 is also able to access the host-physical addresses of the shared memory 395.

In VICs, the first, second, third, and fourth VICs 354, 362, 370, and 378 are virtual interrupt devices that enable the pipe 0 302, pipe 1 303, pipe 2 304, and pipe 3 305 to receive interrupt signals at the first, second, third, and fourth processors 340, 342, 344, and 346 that indicate that an high-priority condition/event exists that needs immediate attention and requires the interruption of the current code that the first, second, third, or fourth processors 340, 342, 344, or 346 is executing. The first, second, third, or fourth processors 340, 342, 344, or 346 responds by suspending its current activities, saving its state, and executing an interrupt function to deal with the even. Since the interrupt is a temporary condition, the first, second, third, or fourth processors 340, 342, 344, or 346 resume normal activity once the interrupt event is finished.

In an example of operation, similar to the example described with regards to FIG. 3, pipe 0 302 may receive the first bus data 195 from the first 1553 bus 102, access the first rule set from the first computer file 316, compare the received first bus data 195 against the first rule set, and determine if the received first bus data 195 violates any sub-rules defined in the first rule set. Once the pipe 0 302 determines that a violation of sub-rule has occurred, the received first bus data 195 (or a modified version of the received first bus data 195) is transmitted to the domain system high 334 of pipe 3 305, via the first signal path 383, as the first output data 388.

Once the domain system high 334 receives the first output data 388, partition 3 309 may include a computer-readable medium (not shown) that includes computer-executable instructions loaded in the computer-readable medium that causes the first, second, third, and/or fourth processors 340, 342, 344, and/or 346 (via the hypervisor 396) to analyze the first output data 388 (which may be a modified or unmodified version of the first bus data 195) that has been determined to violate a sub-rule of the sub-rules defined in the first rule set within the first computer file 316, determine a sub-system (for example, RT 138 or RT 188) that the received first bus data 195 is intended for, attribute a risk level based on the violated sub-rule and the sub-system, and perform a deep packet inspection of the received first bus data 195 based on the risk level and sub-system. In this example, the computer-readable medium may be part of the shared memory 395 and the hypervisor 396 may choose to utilize either first, second, third, or fourth processors 340, 342, 344, or 346, or combination thereof, based on processing availability of each of the processors 340, 344, or 346. Similar to the description in FIG. 2 with relation to the SHPD 206, in this example, the domain system high 334 also includes copies of the first, second, and third computer files 316, 324, and 332 that may have been first loaded to pipe 3 305 from the EPD 192 first and then the domain system high 334 distributed the first, second, and third computer files 316, 324, and 332 to the domain A 310, domain B 318, and domain C 326, respectively.

The results of this analysis are then transmitted by the pipe 3 305 to the BCS 191 via signal path 193 as the system high output signal 380. Where the signal path 193 is a backchannel signal path that is separate and independent of the first, second, or third 1553 buses 102, 104, and 106. Moreover, the pipe 3 305, BCS 191, and the signal path 193 between the pipe 3 305 and BCS 191 are operating at a security level that is at least as high as the highest security level of either the first, second, or third 1553 buses 102, 104, and 106. As discussed before, in this example, the BCS 191 may be a central computer, flight control system, secure on-board computer system, etc. As discussed earlier, in this example, the pipe 3 305 is an external system or sub-system separate from the pipe 0 302 but within the MSLM 300.

Similarly, pipe 1 303 may receive the second bus data 196 from the second 1553 bus 104, access the second rule set from the second computer file 324, compare the received second bus data 196 against the second rule set, and determine if the received second bus data 196 violates any sub-rules defined in the second rule set. Once pipe 1 303 determines that a violation of sub-rule has occurred, the received second bus data 196 (or a modified version of the received second bus data 196) is transmitted to the pipe 3 305, via the second signal path 384, as the second output data 390.

Once the domain system high 334 receives the second output data 390, the computer-readable medium (not shown) of partition 3 309 includes computer-executable instructions loaded in the computer-readable medium that causes the first, second, third, and/or fourth processors 340, 342, 344, and/or 346 (via the hypervisor 396) to analyze the second output data 390 (which may be a modified or unmodified version of the second bus data 196) that has been determined to violate a sub-rule of the sub-rules defined in the second rule set within the second computer file 324, determine a sub-system (for example, RT 158) that the received second bus data 196 is intended for, attribute a risk level based on the violated sub-rule and the sub-system, and perform a deep packet inspection of the received second bus data 196 based on the risk level and sub-system. Again, in this example, the computer-readable medium may be part of the shared memory 395 and the hypervisor 396 may choose to utilize either first, second, third, or fourth processors 340, 342, 344, or 346, or combination thereof, based on processing availability of each of the processors 340, 344, or 346.

The results of this analysis are then transmitted by the pipe 3 305 to the BCS 191 via signal path 193 as the system high output signal 380. Again, the signal path 193 is a backchannel signal path that is separate and independent of the first, second, or third 1553 buses 102, 104, and 106, and the pipe 3 305, BCS 191, and the signal path 193 between the pipe 3 305 and BCS 191 are operating at a security level that is at least as high as the highest security level of either the first, second, or third 1553 buses 102, 104, and 106.

Moreover, pipe 2 304 may receive the third bus data 197 from the third 1553 bus 106, access the third rule set from the third computer file 332, compare the received third bus data 197 against the third rule set, and determine if the received third bus data 197 violates any sub-rules defined in the third rule set. Once pipe 2 304 determines that a violation of sub-rule has occurred, the received third bus data 197 (or a modified version of the received third bus data 197) is transmitted to the pipe 3 305, via the third signal path 385, as the third output data 392.

Again, once the domain system high 334 receives the third output data 392, the computer-readable medium (not shown) of partition 3 309 includes computer-executable instructions loaded in the computer-readable medium that causes the first, second, third, and/or fourth processors 340, 342, 344, and/or 346 (via the hypervisor 396) to analyze the third output data 392 (which may be a modified or unmodified version of the third bus data 197) that has been determined to violate a sub-rule of the sub-rules defined in the third rule set within the third computer file 332, determine a sub-system (for example, RT 172 or RT 174) that the received third bus data 197 is intended for, attribute a risk level based on the violated sub-rule and the sub-system, and perform a deep packet inspection of the received third bus data 197 based on the risk level and sub-system. Again, in this example, the computer-readable medium may be part of the shared memory 395 and the hypervisor 396 may choose to utilize either first, second, third, or fourth processors 340, 342, 344, or 346, or combination thereof, based on processing availability of each of the processors 340, 344, or 346.

In the examples shown in FIGS. 2 and 3, the MSLM 100 and 300 are shown to include three monitoring sections that monitor the three individual 1553 buses (i.e., BDM 200, 202, and 204 for FIG. 2 and pipe 0 302, pipe 1 303, and pipe 304 for FIG. 3). Each monitoring section may include instructions and/or logic configured to receive data from a given 1553 bus, compare it to an individual rule set, and determine a violation before sending the results of determining a violation to the either SHPD 206 or pipe 3 305 of FIGS. 2 and 3, respectively.

Also in these examples, it is appreciated by those of ordinary skill in the art that while three monitoring stovepipe systems (i.e., pipe 0 302, pipe 1 303, and pipe 2 304) are shown, any number of monitoring stovepipe systems (that include at least two) may be utilized in the MSLM 300. As an example, if only two monitoring stovepipe systems (for example, pipe 0 302 and pipe 1 303) are utilized (that correspond functionally to the first BDM 200 and second BDM 202, respectively, shown in FIG. 2) in combination with a third stovepipe system (for example, pipe 3 305) that is a processing device that functionally corresponds to SHPD 206 of FIG. 2, the MSLM, in this example, would include the first stovepipe, second stovepipe system, and third stovepipe system. As described earlier, the first stovepipe system (for example, pipe 0 302) includes a first processor (for example, first processor 340), a first 1553 device interface (for example, 1553 device 348), and a first VM partition (for example, partition 0 306). The second stovepipe system (for example, pipe 1 303) including a second processor (for example, second processor 342), a second 1553 device interface (for example, 1553 device 356), and a second VM partition (for example, partition 1 307). The third stovepipe system (for example, pipe 3 305) including a third processor (for example, fourth processor 346), a network interface (for example, network interface 372), and a third VM partition (for example, partition 3 309). In this example, the first 1553 device interface is in signal communication (i.e., via signal path 108) with a first 1553 bus (i.e., first 1553 bus 102) and the signal communication with the first 1553 bus is only in a receive mode from the first 1553 bus to the first stovepipe system, and the first 1553 bus has a first security level. Similarly, the second 1553 device interface is in signal communication (i.e., via signal path 110) with a second 1553 bus (i.e., second 1553 bus 104) and the signal communication with the second 1553 bus is only in a receive mode from the second 1553 bus to the second stovepipe system, and the second 1553 bus has a second security level. Moreover, the third stovepipe system is configured to control the first stovepipe system and the second stovepipe system and the network interface is configured to communicate at a third security level with the BCS 191 that is separate from the MSLM, and the BCS 191 is in signal communication with the third stovepipe system via a signal path (i.e., signal path 193) that is separate from the plurality of 1553 buses (i.e., first and second 1553 buses 102 and 104). The MSLM also includes a hypervisor (i.e., hypervisor 396) and a shared memory (i.e., shared memory 395), where the hypervisor and shared memory are in signal communication with the first stovepipe system, second stovepipe system, and third stovepipe system.

In this example, if the MSLM includes a third monitoring stovepipe system (i.e., a fourth stovepipe system such as, for example, pipe 2 304), the fourth stovepipe system including a fourth processor (i.e., third processor 344), a third 1553 device interface (i.e., 1553 device 364), and a fourth VM partition (i.e., partition 2 308). In this example, the third 1553 device interface is in signal communication (i.e., signal path 112) with a third 1553 bus (i.e., third 1553 bus 106) and the signal communication with the third 1553 bus is only in a receive mode from the third 1553 bus to the fourth stovepipe system and the third 1553 bus has a fourth security level. As described earlier, the third security level of the third stovepipe system is equal to or higher than the fourth security level.

Figure 4:
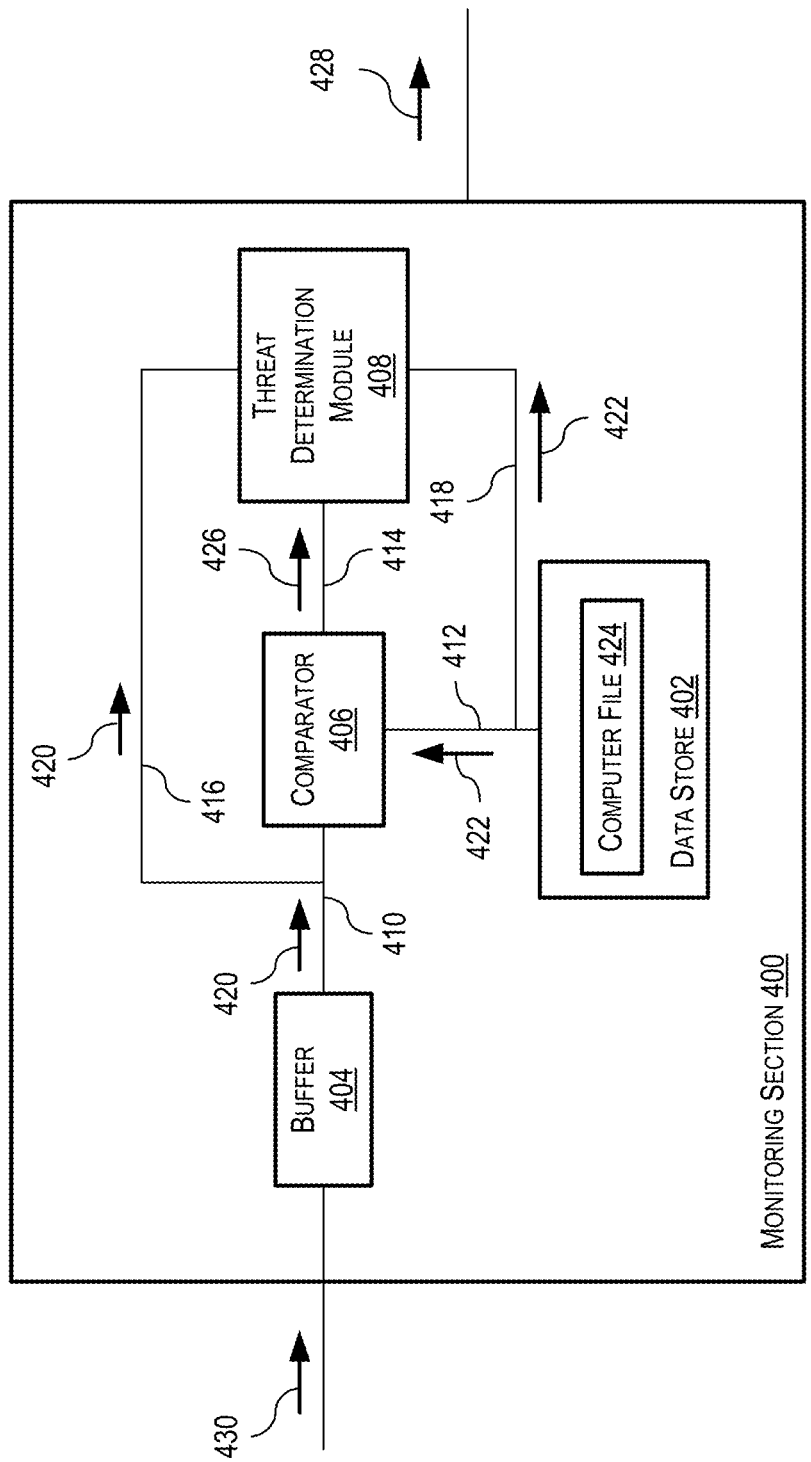
FIG. 4 is a system block diagram of a monitoring section shown, in FIGS. 2 and 3, in accordance with the present disclosure.

Turning to FIG. 4, a system block diagram of the monitoring section 400 is shown in accordance with the present disclosure. In this example, the monitoring section 400 may be implemented optionally as either a BDM 200, 202, or 204, as shown in FIG. 2, or as pipe 0 302, pipe 1 303, and pipe 304, as shown in FIG. 3. In this example, the monitoring section 400 may include a data store 402, a buffer 404, a comparator 406, and a threat determination module 408. In this example, the comparator 406 is in signal communication with buffer 404, data store 402, and threat determination module 408 via signal paths 410, 412, and 414, respectively. The threat determination module 408 is also in signal communication with buffer 404 via signal path 416 and the data store 402 via signal path 418.

As shown in FIGS. 2 and 3, the data store 402 may be part of the computer-readable medium 210, 218, or 226 as data store 212, 220, or 228, respectively, or part of the VM domain A 310, VM domain B 318, or VM domain C 326, respectively. The buffer 404 may be a storage or memory unit or device within either the BDM 200, 202, or 204 or pipe 0 302, pipe 1 303, or pipe 304 and may optionally be part of the computer-readable medium 210, 218, or 226 or the shared memory 395, respectively.

The comparator 406 is a digital comparator and may be a device, module, component, circuit, or other sub-system configured and/or enabled to receive a message 420 from the buffer 404 and compare the message 420 against a rule 422 from a rule set defined by a computer file 424. The threat determination module 408 is a device, module, component, circuit, or other sub-system configured and/or enabled to determine if a violation of the rule 422 has occurred from an output 426 of the comparator 406, the message 420, and the rule 422. It may be, or include, a digital detection module that includes a threshold module, component, device, or circuit. In this example, the comparator 406 and/or threat determination module 408 may be separate devices or a signal device that may be implemented in hardware, software, or both. Moreover, the comparator 406 and/or threat determination module 408 may be part of the one or more processing units 208, 216, or 224 or first, second, or third processors 340, 342, or 344. The response of the threat determination module 408 may be the output data 428 that is transmitted from the monitoring section 400. In this example, the input data 430 to the buffer 404 may be either the first, second, or third 1553 data 195, 196, or 197 and the output data 428 may correspondingly be the first, second, or third output data 238, 242, or 246, or the first, second, or third output data 388, 390, or 392, respectively. Similarly, the computer file 424 may be first, second, or third computer file 214, 222, or 230, or the first, second, or third computer file 316, 324, or 332, respectively.

Turning to FIG. 5, a table 500 of an example of an implementation of monitor rules for the monitoring section 400 is shown in accordance with the present disclosure. In this example, the table 500 has four sections 502, 504, 506, and 508 that correspond to rule numbers for the first section 502, 1553 bus messages for the second section 504, audit functions for the third section 506, and violation triggers for the fourth section 508. In general, the rule number 502 column lists the different rules (for example, rule 422 shown in FIG. 4) that have been established by the rule set in the computer file 424. The rules may be consecutively numbers in the rule number 502 column from, for example, rule 1 510, rule 2 512, to rule 3 514. It is appreciated by those or ordinary skill in the art that in this example only three rules (i.e., rule 1 510, rule 2 512, and rule 3 514) are shown for the convenience of illustration but that the computer file 424 may include any plurality of rules that is greater than three.

In this example, the second section 504 of the table 500 has columns that correspond to different data portions of the messages (such as, for example, message 420) in the received data 195, 196, or 197 that are received from the first, second, or third 1553 bus 102, 104, or 106, respectively. The second section 504 includes a number of sub-sections 518, 520, 522, and 524 that correspond to different information about the messages in the received data 195, 196, or 197. In this example, the first sub-section 518 represents the command word type, and the second sub-section represents the rule threat level 520. If there are commands, the third sub-section 522 represents a first command and, if there is an RT to RT transfer, the fourth sub-section 524 represents a second command in a message. In this example, the first command sub-section 522 may include an RT section 526, transfer ("T/R") section 528, sub-address section ("SB") 530, and word count ("WC") section 532. Additional commands sub-sections such as, for example, address information and other information may also be included. Moreover, if there is an RT to RT transfer, the second command sub-section 524 may also include an RT section 534, T/R section 536, SB 538, and WC section 540.

The command word type sub-section 518 specifies the message type in the received data 195, 196, or 197 that is received from the first, second, or third 1553 bus 102, 104, or 106. The message types include, for example, an RT to RT message, RT to BC message, BC to RT message, and a mode code message. The system threat level 520 is the system level threat level that is based on operation of a system threat as determined by the rule set of the computer file 424. In general, the system threat level 520 determines to which threat level, or threat levels, a given rule pertains to. The system threat level 520 values include inputs that have been pre-defined in a system table by a system administrator. Examples of the system threat level 520 may include lists, ranges, or single values. Additionally, there may be a default threat level that is applied at initial operation of the monitoring section 400 or in the event of an intended or unintended restart. Moreover, there may be a default system-wide threat level that is set to an initial value when messages, in the received data 195, 196, or 197, are initially compared to the rules but then may change during operation.

In general, the second section 504 is similar to an index or look-up table in that when messages, in the received data 195, 196, or 197, are received by the monitoring section 400, the second section 504 is utilized to compare the received messages in the received data 195, 196, or 197 against the rule data 542, 544, and 546 listed in the table 500 that are identified by the corresponding rule numbers (rule 1 510, rule 2 512, and rule 3 514, respectively). These rules (as listed in the rule number section 502) will either be applied or not applied based on whether the received message matches a corresponding rule. These rules themselves may be numerical values, a list of values, a range of values, or "wild cards." As an example, the rule set may include a wild card rule that defines a rule that is utilized for all threat levels or a selected number of threat levels. For example, a wild card rule may define utilizing a rule for threat levels one through three but not for threat levels four and five. Moreover, if a message is received from the receive data 195, 196, or 197 but there is no corresponding rule that matches the message, the monitoring section 400 will determine that the message has violated a rule.

In this example, if the comparator 406 (from FIG. 4) determines a match between the message 420 and the rule 422 that corresponds, for example, with rule 1 510 with rule data 542, the threat determination module 408 then applies the rule 422 (e.g., rule number 1 510) to the message 420 to determine if the data in the message 420 has violated the rule 422 (e.g., rule number 1 510). The monitoring section 400 then utilizes the third section 506 of the table 500, which correspond to audit areas of the rule 510. These audit area section 506 include an "audit of fourth section violations" ("A4SV") sub-section 548 and an "audit data capture" sub-section 550. The A4SV sub-section 548 and/or audit data capture sub-section 550 are triggered if message 420 has violated the rule number 1 510. If the rule number 1 510 has been violated, the message 420 may be audited for violations in A4SV sub-section 548 or the entire message 420 may be stored in its entirety in a memory in the monitoring section 400 with sub-section 550 so that it may be analyzed later.

As an example, the monitoring section 400 may include five different types of audits: 1) non-existing rule message audit; 2) custom rule violation audit; 3) general rule violation audit; 4) allowed message audit; and 5) general disallowed traffic audit. In this example, a non-existing rule message audit may be triggered when any message from the received data 195, 196, or 197 does not match any fields of the second section 504 of a rule. The custom rule violation audit may be triggered when any message from the received data 195, 196, or 197 matches all of the fields of the second section 504 of a rule but violates any field of the fourth section 508 and is marked as audit of fourth section violations in the A4SV sub-section 548. The general rule violation audit may be triggered when any message from the received data 195, 196, or 197 matches all of the fields of the second section 504 of a rule but violates any field of the fourth section 508 and is not marked as audit of fourth section violations in the A4SV sub-section 548. The allowed message audit may be triggered when any message from the received data 195, 196, or 197 matches all of the fields of the second section 504 of a rule and all of fields of the fourth section 508 but is marked for audit by a system administrator. The general disallowed traffic audit may be triggered by a running count of messages from the received data 195, 196, or 197 that do not match with any rule or violate a specific rule.

The fourth section 508 may including a threat and/or risk rating sub-section 552, deep inspection sub-section 554, "yes" or "no" ("YES/NO") sub-section 556, and values sub-section 558. In general, the threat and/or risk rating sub-section 552 is sub-section that is dependent on how sensitive the rule 422 is to certain types of violations by the message 420 and how the rule 422 is determined to operate on the message 420. The threat and/or risk rating sub-section 552 is both a system level threat level and a rule level threat and/or risk level that is given a weighting based on the rule 422. In general, the threat and/or risk rating sub-section 552 is a trigger that sets how quickly a rule violation should be reported out where the weighting is related to how sensitive a rule (i.e., the severity of the rule) is so that once violated the system knows how quickly the violation needs to be reported. The YES/NO sub-section 556 is utilized to determine whether the monitoring section 400 should perform a deep packet inspection of the data in the message 420. If a deep packet inspection 554 is performed, the monitoring section 400 utilizes individual values of the rule 422 in the values sub-section 558. Examples of the values in the values sub-section 558 may include a validate value or other system administrator pre-determined values.

In general, an audit of a message from the received data 195, 196, or 197 based on the A4SV sub-section 548 may be triggered if the message violates the deep inspection values of the deep inspection sub-section 554, threat and/or risk rating sub-section 552, or the values of values sub-section 558. Examples of deep inspection conflicts may include resulting number of elements larger than the maximum allowed number of elements for a message, an unsigned type of value that may be negative or have a value greater than, for example, "FFFF" (in hexadecimal which is equivalent to 65,535), having a range beginning value greater than the range end, having a number of values larger than the listed values, having a number of values that is less than the number of listed values, having no range beginning, having no range end, etc.

Figure 6:
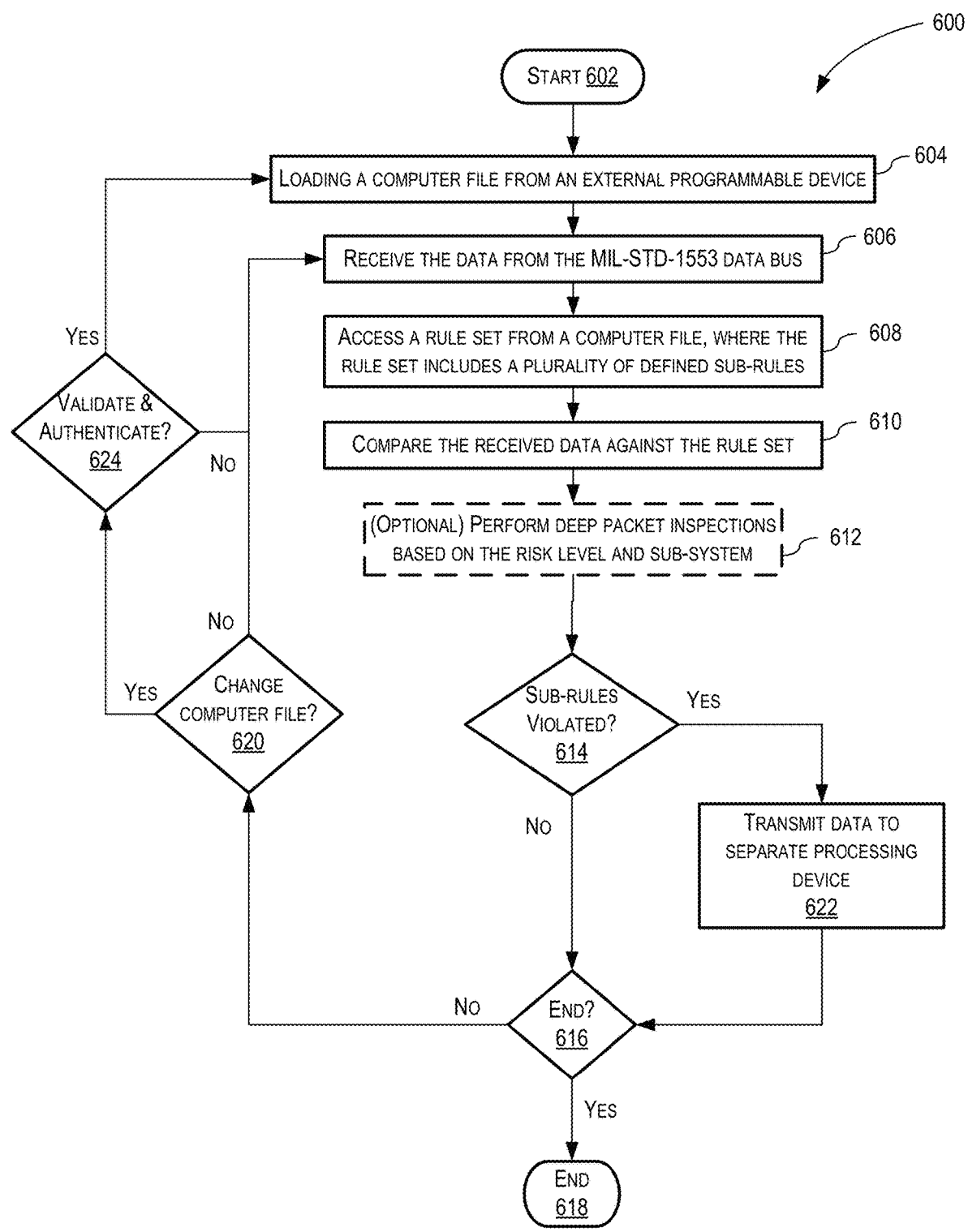
FIG. 6 is a flowchart of an example of an implementation of a method performed by the monitoring section, shown in FIGS. 2 through 4, in operation in accordance with the present disclosure.

In FIG. 6, a flowchart 600 of an example of an implementation of a method performed by the monitoring section 400 in operation is shown in accordance with the present disclosure. The method starts 602 by loading 604 the computer file 424 from the EPD 192. The monitoring section 400 then receives 606 the received data 195, 196, or 197 from the first, second, or third 1553 bus 102, 104, or 106, accesses 608 a rule set from the computer file 424 stored on the computer-readable medium (where the rule set includes a plurality of defined sub-rules), and compares 610 the received data 195, 196, or 197 from the first, second, or third 1553 bus against the rule set. As described earlier, the monitoring section 400 utilizes the YES/NO sub-section 556 to determine whether the monitoring section 400 should perform an optional deep packet inspection 612 of the data in the message 420. If a deep packet inspection 554 is performed, the monitoring section 400 utilizes individual values of the rule 422 in the values sub-section 558.

The monitoring section 400 then determines 614 if the received data 195, 196, or 197 violates any of the sub-rules defined in the rule set. If there is no violation, the method determines 616 if the monitoring section 400 is done monitoring the received data 195, 196, or 197. If the monitoring section 400 is done monitoring the received data 195, 196, or 197, the method ends 618.

If, instead, the monitoring section 400 is not done monitoring the received data 195, 196, or 197, the method continues and the monitoring section 400 determines 620 if the computer file 424 should be changed. If not, the method returns to step 606 and method steps 606 through 620 are repeated. If the received data 195, 196, or 197 continues to not violate any sub-rules, the method continues to repeat steps 604 through 620.

If, instead, the received data 195, 196, or 197 violates a sub-rule, the monitoring section 400 transmits 622 the received data 195, 196, or 197 (as output data 428) to a separate processing device that is the SHPD 206 or pipe 3 305. The method determines 616 if the monitoring section 400 is done monitoring the received data 195, 196, or 197. If the monitoring section 400 is done monitoring the received data 195, 196, or 197, the method ends 618.

Again, if, instead, the monitoring section 400 is not done monitoring the received data 195, 196, or 197, the method again continues and the monitoring section 400 determines 420 if the computer file 424 should be changed. If not, the method returns to step 606 and method steps 606 through 622 are repeated as described earlier.

If, instead, the monitoring section 400 determines 620 that the computer file 424 should be changed, the monitoring section 400 then attempts to validate and authenticate 624 the new computer file 424. If the new computer file 424 is not valid and/or authenticated 624, the monitoring section 400 does not utilize the new computer file 424 and continues to utilize the previously loaded computer file 424 and the method repeats steps 606 through 624. If, instead, the new computer file 424 is valid and authenticated, the monitoring section 400 loads 604 the new computer file 424 from the EPD 192 and the method repeats steps 604 through 624 until finally ending 618 once all the received bus data 195, 196, or 197 has been monitored.

Figure 7:
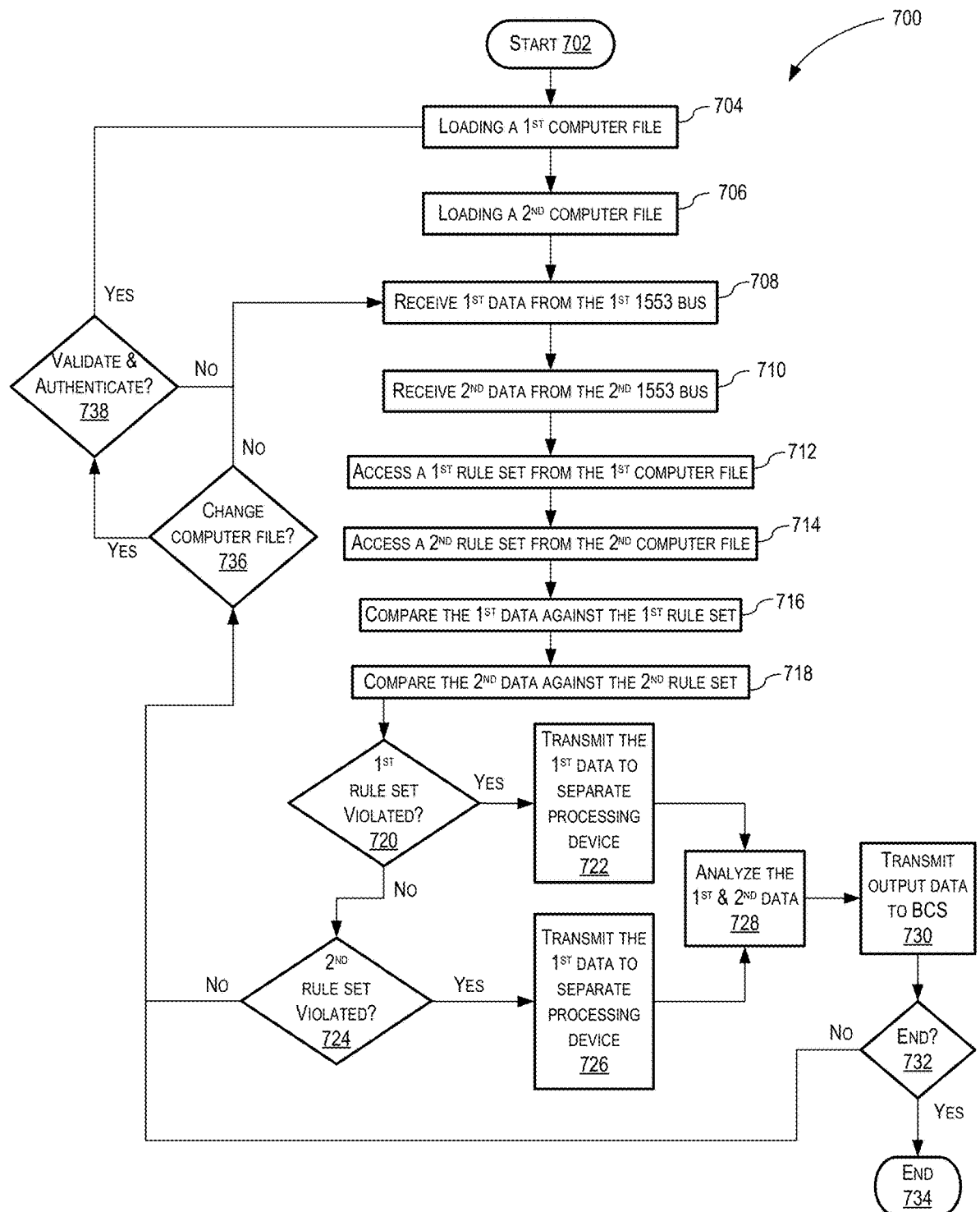
FIG. 7 is a flowchart of an example of an implementation of a method performed by the MSLM, shown in FIGS. 1 through 3, in operation is shown in accordance with the present disclosure.

In FIG. 7, a flowchart 700 of an example of an implementation of a method performed by the MSLM 100 or 300 in operation is shown in accordance with the present disclosure. In this example, the MSLM 100 or 300 is described as monitoring only two 1553 buses 102 and 104 utilizing either BDM 200 and BDM 202 of MSLM 100 or pipe 0 302 and pipe 1 303 of MSLM 300, respectively, for the convenience of illustration but as discussed previously, the MSLM 100 or 300 may monitor any plurality of 1553 buses that includes at least two 1553 buses. In this example, the first 1553 bus is assumed to be at a first security level and the second 1553 bus is assumed to be at a second security level. The combination may be for example: unclassified-confidential; unclassified-secret; unclassified-top secret; confidential-secret; confidential-top secret; and secret-top secret. In this example, for the purposes of simplicity of illustration, it is assumed that the first security level of the first 1553 bus is unclassified and the second security level of the second 1553 bus is secret.

The method starts 702 by loading 704 a first computer file 214 or 316 and loading 706 a second computer file 222 or 324. The MSLM 100 or 300 then receives 708 the first bus data 195 from the first 1553 bus 102 and receives 710 the second bus data 196 from the second 1553 bus 104. The MSLM 100 or 300 then monitors the first bus data 195 to determine if the first bus data 195 violates a first rule set of the first computer file 214 or 316. The MSLM 100 or 300 also monitors the second bus data 196 to determine if the second bus data 196 violates a second rule set of the second computer file 222 or 324. The MSLM 100 or 300 monitors the first bus data 195 by accessing 712 the first rule set from the first computer file 214 or 316 and comparing 716 the first bus data 195 against the first rule set. Approximately simultaneously, the MSLM 100 or 300 also monitors the second bus data 196 by accessing 714 the second rule set from the second computer file 222 or 324 and comparing 718 the second bus data 196 against the second rule set. If the first bus data 195 violates 720 the first rule set, the first bus data 195 is transmitted 722 to the separate processing device (either the SHPD 206 or pipe 3 305) of the MSLM 100 or 300. Similarly, if the second bus data 196 violates 724 the second rule set, the second bus data 196 is transmitted 726 to the separate processing device of the MSLM 100 or 300. The separate processing device (again, either the SHPD 206 or pipe 3 305) then analyzes 728 either the first bus data 195, the second bus data 196, or both and transmits 730 an separate processing device output data (either SHPD output data or system high output data 380) to the BCS 191 via a network inference and signal path 193 that is separate from the first and the second 1553 buses 102 and 104. In this example, the separate processing device will operate at a security level that is at least as high as the highest security level of the first and second 1553 buses 102 and 104. Since it is assumed in this example, that the first 1553 bus is operating as an unclassified bus and the second 1553 bus is operating at a secret security level, the separate processing device will operate at a security level that is at least at a secret security level or a top secret security level. Since the signal path 193 is operating at the same level as the separate processing device, it will also operate at a secret or top secret security level in this example and all data will pass through the signal path 193 to the BCS 191 which is completely separate from the first and second 1553 buses 102 and 104. As such, there is no possibility of any secret information of data from the second 1553 bus 104 be accidently passed to the first 1553 bus 102 that is operating at an unclassified level.

In this example, if the MSLM 100 or 300 determines 732 that it is done monitoring the received first and second bus data 195 and 196, the method ends 734. If, instead, the MSLM 100 or 300 determines 732 that the it is not done monitoring the received first and second bus data 195 and 196, the MSLM 100 or 300 then determines 736 whether to change the first, second, or both computer files 214 or 316 or 222 or 324. Moreover, if the MSLM 100 or 300 determined (in decision steps 720 and 724) earlier that neither the first or second rule sets were violated by the first and second bus data 195 and 196, the MSLM 100 or 300 then also determines 736 whether to change the first, second, or both computer files 214 or 316 or 222 or 324. If the MSLM 100 or 300 then determines 736 that the first or second computer files 214 or 316 or 222 or 324 are not be changed, the method returns to step 708 and the method repeats steps 708 through 736. If, instead, the MSLM 100 or 300 determines 736 that the first or second computer files 214 or 316 or 222 or 324 are to be changed, the MSLM 100 or 300 then attempts to validate and authenticate 738 the new first or second computer files 214 or 316 or 222 or 324. If the new first or second computer files 214 or 316 or 222 or 324 are not valid and/or authenticated 738, the MSLM 100 or 300 does not utilize the new first or second computer files 214 or 316 or 222 or 324 and continues to utilize the previously loaded first or second computer files 214 or 316 or 222 or 324 and the method repeats steps 708 through 738. If, instead, the first or second computer files 214 or 316 or 222 or 324 are valid and authenticated, the MSLM 100 or 300 loads 704 and 706 the new first or second computer files 214 or 316 or 222 or 324 and the method repeats steps 704 through 738 until finally ending 734 once all the received bus data 195 and 196 has been monitored.

It will be understood that various aspects or details of the invention may be changed without departing from the scope of the invention. It is not exhaustive and does not limit the claimed inventions to the precise form disclosed. Furthermore, the foregoing description is for the purpose of illustration only, and not for the purpose for limitation. Modifications and variations are possible in light of the above description or may be acquired from practicing the invention. The claims and their equivalents define the scope of the invention.

The flowchart and block diagrams in the different depicted example of implementations illustrate the architecture, functionality, and operation of some possible implementations of apparatuses and methods in an illustrative example. In this regard, each block in the flowchart or block diagrams may represent a module, a segment, a function, a portion of an operation or step, some combination thereof.

In some alternative examples of implementations, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different examples of implementations has been presented for purposes of illustration and description, and is not intended to be exhaustive or limited to the examples in the form disclosed. Many modifications and variations will be apparent to those of ordinary skill in the art. Further, different examples of implementations may provide different features as compared to other desirable examples. The example, or examples, selected are chosen and described in order to best explain the principles of the examples, the practical application, and to enable others of ordinary skill in the art to understand the disclosure for various examples with various modifications as are suited to the particular use contemplated.

What is claimed is:

1. A multiple security level monitor comprising:
    a first bus data monitor configured to receive signal communication from a first MIL-STD-1553 data bus of a plurality of the MIL-STD-1553 data buses, the first MIL-STD-1553 data bus having a first security level, wherein the first bus data monitor comprises:
        a processor; and
        a computer-readable medium storing instructions that are executable by the processor to cause the processor to perform operations comprising:
            receiving first bus data from the first MIL-STD-1553 data bus;
            accessing a rule set from a computer file stored on the computer-readable medium, wherein the rule set comprises a plurality of sub-rules;
            performing a comparison between the first bus data and the rule set;
            determining if the first bus data violates any of the plurality of sub-rules defined in the rule set based on the comparison; and
            transmitting the first bus data to a system high processing device for further analysis responsive to determining that the first bus data violates a first sub-rule of the plurality of sub-rules;
    a second bus data monitor configured to receive signal communication from a second MIL-STD-1553 data bus of the plurality of the MIL-STD-1553 data buses, the second MIL-STD-1553 data bus having a second security level; and
    the system high processing device, wherein the system high processing device has a third security level that is equal to or greater than the first security level, wherein the third security level is equal to or greater than the second security level, wherein the system high processing device is configured to control the first bus data monitor via a first signal path distinct from the plurality of MIL-STD-1553 data buses, wherein the system high processing device is configured to control the second bus data monitor via a second signal path distinct from the plurality of MIL-STD-1553 data buses, wherein the system high processing device comprises a network interface configured to communicate at the third security level with a back channel system that is distinct from the multiple security level monitor.

2. The multiple security level monitor of claim 1, wherein the first security level corresponds to a confidential security level, and wherein the second security level corresponds to a secret security level.

3. The multiple security level monitor of claim 1, wherein the first data bus monitor comprises:
a first 1553 device interface; and
a first virtual machine partition, wherein the first 1553 device interface is configured to receive signal communication from the first MIL-STD-1553 data bus.

4. The multiple security level monitor of claim 1, wherein the processor is a first processor and the system high processing device comprises:
a second processor; and
a system high processing device computer-readable medium storing instructions that are executable by the second processor to cause the second processor to perform operations comprising:
analyzing the first bus data responsive to determining that the first bus data violates the first sub-rule the plurality of sub-rules;
identifying a sub-system corresponding to the first bus data;
determining a risk level based on the first sub-rule and the sub-system;
performing deep packet inspections based on the risk level and the sub-system; and
transmit a system high processing device output data to the back channel system via a third signal path, wherein the system high processing device output data has the third security level.

5. The multiple security level monitor of claim 4, further comprising a third bus data monitor configured to receive signal communication from a third MIL-STD-1553 data bus of the plurality of the MIL-STD-1553 data buses, the third MIL-STD-1553 data bus having a fourth security level, wherein the third security level is equal to or greater than the fourth security level.

6. A multiple security level monitor comprising:
a first stovepipe system comprising:
a first processor;
a first 1553 device interface; and
a first virtual machine partition, wherein the first 1553 device interface is configured to receive signal communication from a first MIL-STD-1553 data bus of a plurality of MIL-STD-1553 data buses having different security levels, wherein the first MIL-STD-1553 data bus has a first security level, wherein the first virtual machine partition comprises:
a first operating system;
a first virtual 1553 interface device; and
a first computer file, wherein the first virtual machine partition is configured to be in signal communication with a third stovepipe system via a first signal path of a plurality of signal paths that are separate from the plurality of MIL-STD-1553 data buses;
a second stovepipe system comprising:
a second processor;
a second 1553 device interface; and
a second virtual machine partition, wherein the second 1553 device interface is configured to receive signal communication from a second MIL-STD-1553 data bus of the plurality of MIL-STD-1553 data buses, and wherein the second MIL-STD-1553 data bus has a second security level;
the third stovepipe system, wherein the third stovepipe system comprises:
a third processor;
a network interface; and
a third virtual machine partition, wherein the third stovepipe system is configured to control the first stovepipe system and the second stovepipe system, wherein the network interface is configured to communicate, via a signal path that is separate from the plurality of MIL-STD-1553 data buses, at a third security level with a back channel system that is separate from the multiple security level monitor;
a hypervisor; and
a shared memory, wherein the hypervisor and shared memory coupled to the first stovepipe system, second stovepipe system, and third stovepipe system.

7. The multiple security level monitor of claim 6, further including
a fourth stovepipe system including:
a fourth processor;
a third 1553 device interface; and
a fourth virtual machine partition, wherein the third 1553 device interface is configured to receive signal communication from a third MIL-STD-1553 data bus, wherein the third MIL-STD-1553 data bus has a fourth security level, and wherein the third security level is equal to or higher than the fourth security level.

8. The multiple security level monitor of claim 6, wherein the first stovepipe system further comprises:
a first 1553 interface device;
a first cache memory;
a first input-output memory management unit; and
a first virtual interrupt controller.

9. The multiple security level monitor of claim 8, wherein the first security level corresponds to a confidential security level, and wherein the second security level corresponds to a secret security level.

10. The multiple security level monitor of claim 6, wherein the second stovepipe system further comprises:
a second 1553 interface device;
a second cache memory;
a second input-output memory management unit; and
a second virtual interrupt controller, wherein the second virtual machine partition comprises:
a second operating system;
a second virtual 1553 interface device; and
a second computer file, wherein the second virtual machine partition is configured to be in signal communication with the third stovepipe system via a second signal path of the plurality of signal paths that are separate from the plurality of MIL-STD-1553 data buses.

11. The multiple security level monitor of claim 10, wherein the third stovepipe system further comprises:
a third 1553 interface device;
a third cache memory;
a third input-output memory management unit; and
a third virtual interrupt controller, wherein the third virtual machine partition comprises a third operating system, and a third computer file.

12. The multiple security level monitor of claim 11, further including a fourth stovepipe system including a fourth processor, a third 1553 device interface, and a fourth virtual machine partition, wherein the fourth virtual machine partition comprises:
a fourth operating system;
a third virtual 1553 interface device, and
a fourth computer file, wherein the fourth virtual machine partition is configured to be in signal communication with the third stovepipe system via a third signal path of the plurality of signal paths that are separate from the plurality of MIL-STD-1553 data buses.

13. The multiple security level monitor of claim 12, wherein the first operating system, second operating system, third operating system, and fourth operating system are the same operating system.

14. The multiple security level monitor of claim 12, wherein copies of the first computer file, second computer file, and fourth computer file are also on the third stovepipe system.

15. A method, comprising:
receiving first bus data from a first MIL-STD-1553 data bus in signal communication with a first bus data monitor, wherein the first MIL-STD-1553 data bus has a first security level;
receiving second bus data from a second MIL-STD-1553 data bus in signal communication with a second bus data monitor, wherein the second MIL-STD-1553 data bus has a second security level;
monitoring the first bus data to determine whether the first bus data violates a first rule set by:
accessing a rule set from a computer file stored on a computer-readable medium, wherein the rule set comprises a plurality of sub-rules:
performing a comparison between the first bus data with the rule set;
determining whether the first bus data violates any of the plurality of sub-rules based on the comparison; and
transmitting the first bus data to a system high processing device responsive determining that the first bus data violates a first sub-rule of the plurality of sub-rules;
monitoring the second bus data to determine whether the second bus data violates a second rule set;
transmitting the first bus data to the system high processing device responsive to the first bus data violating the first rule set;
transmitting the second bus data to the system high processing device responsive to the second bus data violating the second rule set;
analyzing the first bus data with the system high processing device; and
transmitting a system high processing device output data to a back channel system, that is separate from a multiple security level monitor, via a network interface that is separate from the first MIL-STD-1553 data bus and second MIL-STD-1553 data bus, wherein the system high processing device output data is based on results of analyzing the first bus data, and wherein the system high processing device output data has a third security level that is equal to or higher than the first security level, and wherein the third security level is equal to or greater than the second security level.

16. The method of claim 15, wherein the first security level corresponds to a confidential security level, and wherein the second security level corresponds to a secret security level.

17. The method of claim 15, wherein accessing the rule set comprises loading the computer file from an external programmable device that is in signal communication with the multiple security level monitor.

18. The method of claim 15, wherein analyzing the first bus data comprises:
identifying a sub-system corresponding to the first bus data;
attributing a risk level based on the first sub-rule and the sub-system; and
performing deep packet inspections based on the risk level and sub-system.

19. The method of claim 15 further including
receiving third bus data from a third MIL-STD-1553 data bus in signal communication with a third bus data monitor, wherein the third MIL-STD-1553 data bus has a fourth security level;
monitoring the third bus data to determine whether the third bus data violates a third rule set;
transmitting the third bus data to the system high processing device responsive to determining that the third bus data violates a first sub-rule of the third rule set; and
analyzing the third bus data with the system high processing device, wherein the system high processing device output data to the back channel system is further based on results of analyzing the third bus data, and wherein the third security level of the system high processing device output data is equal to or higher than the fourth security level.

20. The method of claim 19, wherein analyzing the third bus data comprises:
identifying a sub-system corresponding to the third bus data;
attributing a risk level based on the first sub-rule and the sub-system; and
performing deep packet inspections based on the risk level and sub-system.

* * * * *